United States Patent
Kent

(10) Patent No.: US 12,273,682 B2
(45) Date of Patent: Apr. 8, 2025

(54) ELECTROACOUSTIC TRANSDUCER ARRAY

(71) Applicant: BAE SYSTEMS plc, London (GB)

(72) Inventor: Lionel William John Kent, Chelmsford (GB)

(73) Assignee: BAE SYSTEMS PLC, London (GB)

(*) Notice: Subject to any disclaimer, the term of this patent is extended or adjusted under 35 U.S.C. 154(b) by 598 days.

(21) Appl. No.: 16/631,721

(22) PCT Filed: Jul. 10, 2018

(86) PCT No.: PCT/GB2018/051956
§ 371 (c)(1),
(2) Date: Jan. 16, 2020

(87) PCT Pub. No.: WO2019/016514
PCT Pub. Date: Jan. 24, 2019

(65) Prior Publication Data
US 2020/0186937 A1    Jun. 11, 2020

(30) Foreign Application Priority Data

Jul. 19, 2017 (EP) ..................................... 17275112
Jul. 19, 2017 (GB) ..................................... 1711609
(Continued)

(51) Int. Cl.
*H04R 17/10* (2006.01)
*B06B 1/06* (2006.01)
(Continued)

(52) U.S. Cl.
CPC ........... *H04R 17/10* (2013.01); *B06B 1/0618* (2013.01); *B06B 1/0644* (2013.01); *G01N 29/28* (2013.01);
(Continued)

(58) Field of Classification Search
CPC ........................................................ H01L 41/08
See application file for complete search history.

(56) References Cited

U.S. PATENT DOCUMENTS 2,906,993 A * 9/1959 Steinberger .......... G10K 11/205
367/149
3,337,843 A    8/1967 Kendig et al.
(Continued)

FOREIGN PATENT DOCUMENTS

| CN | 103048330 A | 4/2013 |
| CN | 106650179 A | 5/2017 |

(Continued)

OTHER PUBLICATIONS

International Search Report and Written Opinion received for PCT Application No. PCT/GB2018/051956. Mail date: Oct. 29, 2018. 12 pages.
(Continued)

*Primary Examiner* — Isam A Alsomiri
*Assistant Examiner* — Vikas Atmakuri
(74) *Attorney, Agent, or Firm* — Finch & Maloney PLLC

(57) ABSTRACT

An electroacoustic transducer array 110 is described. The electroacoustic transducer array 110 comprises a first electroacoustic transducer 40A comprising a first active element 41A and a second electroacoustic transducer 40B comprising a second active element 41B. The electroacoustic transducer array 110 comprises an acoustic coupling layer 43 arranged to acoustically couple, in use, the first active element 41A and the second active element 41B to a transmission medium. The electroacoustic transducer array 110 comprises a first cavity 42A arranged between the first active element 41A and the acoustic coupling layer 43 to receive a first fluid; and/or a second cavity 42B arranged between the second active element 41B and the acoustic coupling layer 43 to receive a second fluid. In this way,
(Continued)

acoustic coupling of the electroacoustic transducer array 110 and the transmission medium is improved.

20 Claims, 15 Drawing Sheets

(30) Foreign Application Priority Data

Sep. 25, 2017 (EP) .................................... 17275149
Sep. 25, 2017 (GB) .................................... 1715467

(51) Int. Cl.
| | | |
|---|---|---|
| G01N 29/28 | (2006.01) | |
| G01S 7/521 | (2006.01) | |
| G10K 11/00 | (2006.01) | |
| G10K 11/02 | (2006.01) | |
| H04B 1/40 | (2015.01) | |
| H04B 11/00 | (2006.01) | |
| H04L 27/00 | (2006.01) | |
| H04R 17/00 | (2006.01) | |

(52) U.S. Cl.
CPC ............ *G01S 7/521* (2013.01); *G10K 11/002* (2013.01); *G10K 11/02* (2013.01); *H04B 1/40* (2013.01); *H04B 11/00* (2013.01); *H04L 27/0002* (2013.01); *H04R 17/00* (2013.01); *B06B 2201/55* (2013.01); *G01N 2291/0231* (2013.01)

(56) References Cited

U.S. PATENT DOCUMENTS

| | | | |
|---|---|---|---|
| 3,891,871 A | 6/1975 | Henriquez et al. | |
| 3,946,599 A | 3/1976 | Patt | |
| 4,033,178 A * | 7/1977 | Holt | G01N 29/28 |
| | | | 73/644 |
| 4,246,791 A * | 1/1981 | Glenn | A61B 8/00 |
| | | | 73/620 |
| 4,545,385 A * | 10/1985 | Pirschel | A61B 8/0825 |
| | | | 128/915 |
| 4,565,096 A * | 1/1986 | Knecht | G01L 13/025 |
| | | | 361/283.4 |
| 4,672,591 A * | 6/1987 | Breimesser | B06B 1/067 |
| | | | 310/326 |
| 4,982,385 A | 1/1991 | Eynck | |
| 5,052,393 A | 10/1991 | Greenstein | |
| 5,494,038 A | 2/1996 | Wang et al. | |
| 5,648,941 A * | 7/1997 | King | B06B 1/0681 |
| | | | 367/176 |
| 5,770,801 A * | 6/1998 | Wang | A61B 8/0866 |
| | | | 604/892.1 |
| 6,155,982 A | 12/2000 | Hunt | |
| 6,617,765 B1 * | 9/2003 | Lagier | G10K 13/00 |
| | | | 310/330 |
| 6,690,620 B1 * | 2/2004 | Mapes | G10K 11/02 |
| | | | 367/152 |
| 6,758,094 B2 * | 7/2004 | Miller | B06B 1/0292 |
| | | | 73/632 |
| 7,719,170 B1 * | 5/2010 | Kim | H01L 41/29 |
| | | | 310/335 |
| 9,050,053 B2 * | 6/2015 | Morgan | A61B 8/4281 |
| 9,121,817 B1 | 9/2015 | Roach et al. | |
| 9,308,554 B2 * | 4/2016 | Campbell | B06B 1/0614 |
| 2004/0025576 A1 * | 2/2004 | Glauser | G01N 29/02 |
| | | | 73/61.79 |
| 2006/0043843 A1 * | 3/2006 | Sugiura | G01S 7/521 |
| | | | 310/348 |
| 2007/0175282 A1 | 8/2007 | Fetzer et al. | |
| 2009/0071253 A1 * | 3/2009 | Olsen | G01B 17/02 |
| | | | 73/602 |
| 2011/0255375 A1 * | 10/2011 | Mosca | B06B 1/0618 |
| | | | 367/157 |
| 2012/0163126 A1 * | 6/2012 | Campbell | B06B 1/0614 |
| | | | 367/135 |
| 2012/0194973 A1 * | 8/2012 | Baliga | G10K 15/04 |
| | | | 361/679.01 |
| 2013/0030727 A1 * | 1/2013 | Zalameda | G01N 29/045 |
| | | | 702/56 |
| 2013/0160553 A1 * | 6/2013 | Gruca, Jr. | G01N 29/048 |
| | | | 73/632 |
| 2013/0315037 A1 * | 11/2013 | Mosca | B06B 1/0618 |
| | | | 367/159 |
| 2014/0254325 A1 | 9/2014 | Korbler et al. | |
| 2015/0000408 A1 | 1/2015 | Turner et al. | |
| 2016/0274067 A1 * | 9/2016 | Walker | G01N 29/4418 |
| 2018/0043285 A1 * | 2/2018 | Gagnon | G01N 29/265 |
| 2019/0060954 A1 | 2/2019 | Mosca et al. | |
| 2020/0186936 A1 * | 6/2020 | Kent | H04R 17/00 |

FOREIGN PATENT DOCUMENTS

| | | |
|---|---|---|
| EP | 0031614 A1 | 7/1981 |
| KR | 20160008280 A | 1/2016 |
| WO | 2019016514 A1 | 1/2019 |
| WO | 2019016515 A1 | 1/2019 |

OTHER PUBLICATIONS

Extended European Search Report received for EP Application No. 17275149.7, dated Jun. 21, 2018. 7 pages.
GB Search Report under Section 17(5) received for GB Application No. 1715467.5, dated Feb. 28, 2018. 4 pages.
International Search Report and Written Opinion received for PCT Application No. PCT/GB2018/051957. Mail date: Dec. 21, 2018. 18 pages.
Invitation to Pay Additional Fees And, Where Applicable, Protest Fee, and Annex to Form PCT/ISA/206 received for PCT Application No. PCT/GB2018/051957. Mail date: Oct. 31, 2018. 11 pages.
Extended European Search Report received for EP Application No. 17275128.1, dated Jun. 15, 2018. 7 pages.
GB Search Report under Section 17(5) received for GB Application No. 1713707.6, dated Feb. 20, 2018. 5 pages.
GB Search Report under Section 17(6) received for GB Application No. 1713707.6, dated Aug. 17, 2018. 2 pages.
Li, et al., "Broadband gradient impedance matching using an acoustic metamaterial for ultrasonic transducers," Scientific Reports, Published Feb. 17, 2017. 9 pages.
Fletcher, Neville, H. and Thwaites, Suzanne, "Multi-horn matching plate for ultrasonic transducers," Ultrasonics, vol. 30., No. 2, 1992. pp. 67-75.
International Preliminary Report on Patentability received for PCT Application No. PCT/GB2018/051957. Mail Date: Jan. 30, 2020. 11 pages.
International Preliminary Report on Patentability received for PCT Application No. PCT/GB2018/051956. Mail Date: Jan. 30, 2020. 7 pages.
United States Patent and Trademark Office, Final Office Action issued in U.S. Appl. No. 16/631,719, filed Aug. 26, 2022.
United States Patent and Trademark Office, Non-Final Office Action in U.S. Appl. No. 16/631,719, filed Dec. 21, 2022.

* cited by examiner

AMM

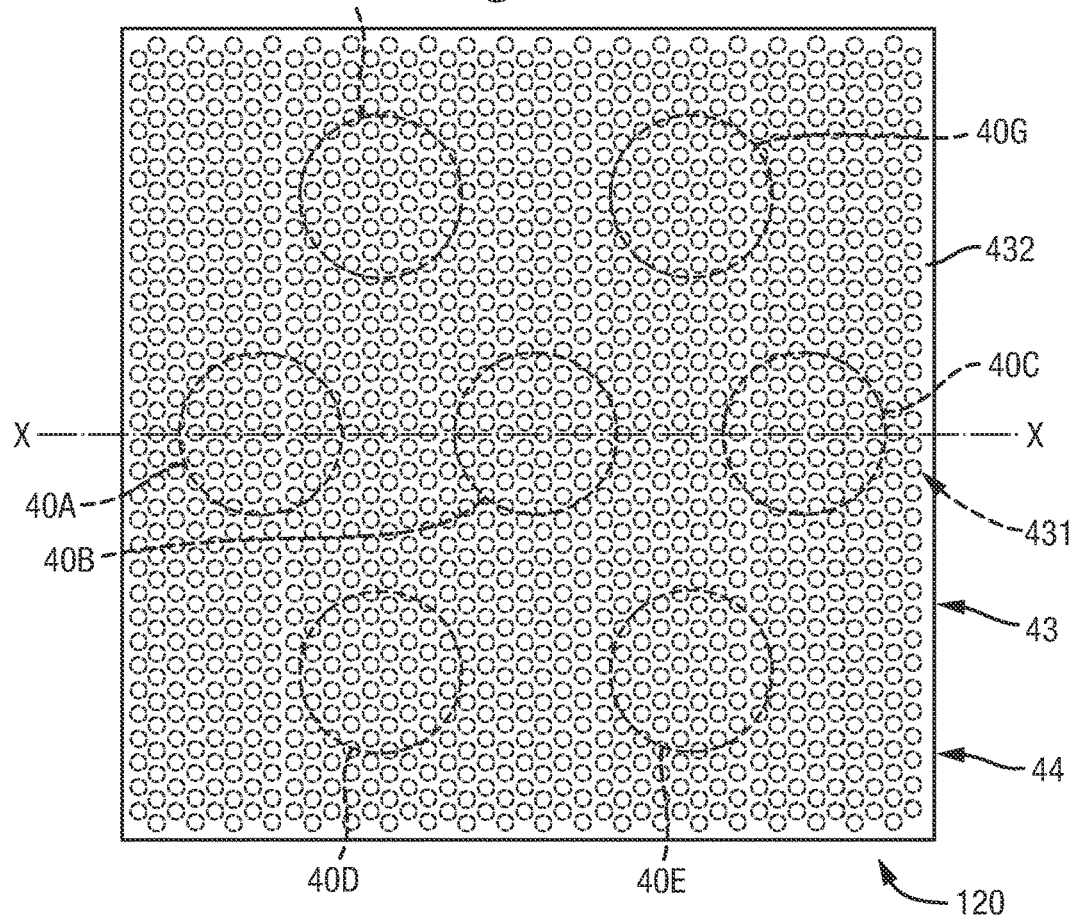
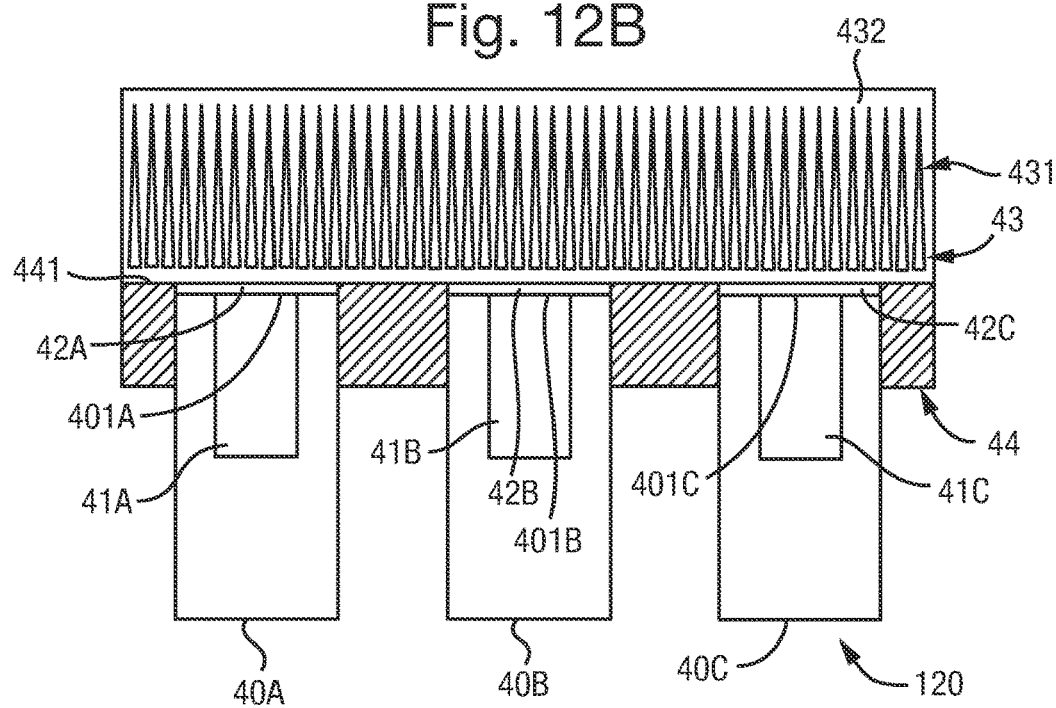

ELECTROACOUSTIC TRANSDUCER ARRAY

FIELD

The present invention relates generally to electroacoustic transducers. More particularly, the present invention relates to arrays of electroacoustic transducers for acoustic transmission and/or reception through transmission media.

BACKGROUND TO THE INVENTION

Generally, electroacoustic transducers are used for transmitting and/or receiving acoustic signals. Such electroacoustic transducers may be used for example in scanners, tomography systems, sonar devices or for data and/or power transmission.

Coupling of sound from an active element of the electroacoustic transducer into the transmission medium may affect a mechanical Q of the electroacoustic transducer, resulting in reduced frequency bandwidth, reduced peak power and/or reduced range, for example. Hence, there is a need to improve electroacoustic transducers.

SUMMARY OF THE INVENTION

The example embodiments have been provided with a view to addressing at least some of the difficulties that are encountered with conventional electroacoustic transducers, whether those difficulties have been specifically mentioned above or will otherwise be appreciated from the discussion herein.

According to a first aspect, there is provided an electroacoustic transducer comprising:
  an active element; and
  an acoustic coupling layer arranged to acoustically couple, in use, the active element to a transmission medium;
  wherein the electroacoustic transducer further comprises a cavity arranged between the active element and the acoustic coupling layer to receive a fluid;
  whereby acoustic coupling of the electroacoustic transducer and the transmission medium is improved.

According to a second aspect, there is provided a Tonpilz transducer comprising:
  an active element; and
  an acoustic coupling layer arranged to acoustically couple, in use, the active element to a transmission medium;
  wherein the acoustic coupling layer comprises an acoustic meta-material.

According to a third aspect, there is provided an array comprising a plurality of transducers according to the first aspect and/or the second aspect.

According to a fourth aspect, there is provided an electroacoustic transducer array comprising a first electroacoustic transducer comprising a first active element and a second electroacoustic transducer comprising a second active element, wherein the electroacoustic transducer array comprises:
  an acoustic coupling layer arranged to acoustically couple, in use, the first active element and the second active element to a transmission medium;
  a first cavity arranged between the first active element and the acoustic coupling layer to receive a first fluid; and/or
  a second cavity arranged between the second active element and the acoustic coupling layer to receive a second fluid;
  whereby acoustic coupling of the electroacoustic transducer array and the transmission medium is improved.

DETAILED DESCRIPTION OF THE INVENTION

According to the first aspect, there is provided an electroacoustic transducer comprising:
  an active element; and
  an acoustic coupling layer arranged to acoustically couple, in use, the active element to a transmission medium;
  wherein the electroacoustic transducer further comprises a cavity arranged between the active element and the acoustic coupling layer to receive a fluid;
  whereby acoustic coupling of the electroacoustic transducer and the transmission medium is improved.

It should be understood that the cavity mechanically and/or structurally isolates the acoustic coupling layer from the active element. That is, while the acoustic coupling layer improves acoustic coupling of the electroacoustic transducer and the transmission medium, a mass of the acoustic coupling layer does not significantly affect a mechanical Q of the transducer, since the mass of the acoustic coupling layer does not add to a mass of the active element, for example. The cavity comprising the fluid thus provides a buffer layer (also known as an acoustic intermediate layer). The acoustic coupling layer provides an anti-reflection structure.

In this way, coupling of sound from the resonating transducer structure (i.e. the active element) into the transmission medium may be improved so as to reduce the mechanical Q of the transducer. In this way, a centre operating frequency of the transducer may be reduced so as to increase range, while preserving high peak powers. Alternatively, the centre operating frequency of the transducer may be increased, for private and/or covert transmissions and/or communications at a decreased range, for example due to reduced losses within the vibrating transducer. In this way, transducer losses may be reduced, for example, at least in part due to the reduced mechanical Q.

In other words, an overall mechanical Q of the transducer may be reduced, thereby increasing a fractional bandwidth (i.e. widening the bandwidth). By increasing the fractional bandwidth, a lower centre frequency may be provided and/or an increased active sonar range and/or an increased transmitted power, for example peak power. In this way, the transducer may be arranged, for example located, outside of the transmission medium, for example on an opposed side of a wall from the transmission medium. For example, by arranging an acoustic meta-material, as described below, on an outside of a metal pressure hull of a submarine may permit the transducer to be arranged on the inside of the pressure hull, by virtue of the acoustic meta-material suppressing reflections on the outer metal-water interface. Additionally and/or alternatively, by increasing the fractional bandwidth, support of multiple sub-bands may be provided, for example to enable multiple targets, such as a real target and one or more decoy targets, to be tracked. For example, a plurality of such transducers may be grouped in a 2D transducer array and the transducer array may be used as or operate similarly to a phased array radar. Partitioning the fractional bandwidth into multiple, for example independent, sub-bands may allow separate targets to be tracked without signal interference between respective return signals from each target.

Benefits of Increased Frequency Bandwidth

Active acoustic sonar transducers suffer from low coupling efficiencies of the acoustic power from the transducer to the ocean. This reduces the peak acoustic power level that can be launched. This in turn limits the sonar range or increases the electrical power required to achieve the same range. In a small platform, such as a torpedo, power is limited, and the use of the propulsion system to generate power is undesirable due to the reduction of velocity and range.

A corresponding effect is the increase of the Q factor of the transducer, which limits the fractional bandwidth $\Delta f/fc$ of the transmitted signal. A reduced bandwidth widens the pulse width ($\sim 1/\Delta f$) of the transmitted pulse which limits range resolution.

Sonar seekers typically consist of 2D transducer arrays which operate in a manner similar to phased array radars. Therefore like phased array radars, multiple targets could be tracked if the frequency bandwidth of the transducer can be made sufficiently wide. This could be achieved by partitioning the available bandwidth into sub-bands, one for each target, to prevent signal interference from different targets that are being simultaneously tracked.

Another option would be to enhance the post-digitised receiver signal to noise ratio by using swept-frequency signal digital processing techniques over wider frequency bands. The benefit of this approach is that it would reduce the probability of false alarms.

Current sonar systems have fractional frequency bandwidths $\Delta f/fc$ that is much smaller than an octave, depending on the sonar type. A transducer structure with an inherently wider fractional bandwidth performance, could for the same overall frequency bandwidth, be designed to operate at a lower centre frequency. The benefit of reducing the centre frequency is that the acoustic attenuation losses in seawater of the sonar return signal from targets at long range will be considerably lower. Although the ambient sea state noise level increases as the operating frequency is reduced (FIG. 1) this noise issue is more than compensated by the reduction in acoustic attenuation from targets at extended ranges. Consider for example a 5 kHz bandwidth transducer. Reducing the centre frequency from say 40 kHz to 20 kHz will increase the average ambient sea state noise level of the sonar system by ~5 dB. However operating at the lower frequency would improve the returned signal from a target at 3 km range by ~41 dB for the same sonar array diameter. This large increase in received signal level relative to the ambient background sea-state noise would support a considerable increase in range. Generally, the signal noise level NL in units of dB is given by: NL=NSL+10 log Df–DI, where NSL is the Noise Spectrum Level; Df is the frequency bandwidth; and DI is the Directivity Index which is a measure of how directive the transmitted sonar beam is relative to a pure hemi spherically uniform illumination, again measured in units of dB. Generally, it would not be possible to increase the range by orders of magnitude despite the 41 dB number. Typically, the increase in range would be >=factor 2 because additional acoustic attenuation in the seawater at 20 kHz at the lower frequency of 21.6 dB for the additional 6 km of there and back path, giving a contribution 21.6 dB. In addition, the return signal for geometric beam spreading reasons will be reduced by 12 dB, giving a total 33.6 dB and thus offsetting in part the improvement benefit as the range increases further.

Therefore there is a strong driver to improve the coupling efficiency of the transducer to the water to improve range/power efficiency and range resolution performance.

This calculation may be similarly extended for other target ranges in reference to the impact of acoustic attenuation by using the acoustic attenuation data of Table 1, as shown below. With regard to range increases, if the range is doubled, then the received return echo for a given fixed frequency will be of the order of 12 dB lower due to the effect of diffraction spreading, and separately further additional losses due to acoustic attenuation over the increased range path.

Active Element

It should be understood that the active element generates and/or receives sound via a piezoelectric effect and/or an electromagnetic effect and/or an electrical effect, for example. In one example, the active element comprises a piezoelectric material, whereby sound is generated and/or received via the piezoelectric effect. In one example, the active element comprises a magnetostrictive material, whereby sound is generated and/or received via the electromagnetic effect. In one example, the active element comprises a conductive material, whereby sound is generated and/or received via the electromagnetic effect according to a Lorentz force. In one example, the active element comprises an electrostrictive material, whereby sound is generated and/or received via the electrical effect according to a Lorentz force. In one example, the active element comprises a plurality and/or a mixture of such materials. Preferably, the active element comprises a piezoelectric material.

Cavity

Bulk wave acoustic transducers are mechanically resonant structures, and good acoustic coupling between a resonating active element of the transducer, for example a resonating piezo-electric platelet of the transducer, and the acoustic medium (also known as a transmission medium) onto and/or into which it is interfaced, is required to support a wide signal frequency bandwidth response. This is a consequence of the well-known phenomena that the frequency bandwidth of a mechanical vibrating structure is a function of the mechanical Q of the structure, which is given by:

$$Q = \frac{f_r}{\Delta f} = 2\pi f_r \frac{\text{Energy stored}}{\text{Power Loss per cycle}} \quad (1)$$

Where $f_r$ is the natural resonant frequency of the structure, and $\Delta f$ is the frequency bandwidth (half power) of the structure.

A further practical constraint on the frequency bandwidth of an acoustic transducer is set by its electromechanical coupling coefficient. An example is the electromechanical coupling coefficient known in the art as '$k_t$', for example, associated with thin transducers whose cross-section is much wider than the thickness of the transducer. It is concerned with mechanical vibrations excited in the platelet thickness direction between electrodes on each end. This constant coefficient gives a measure of the coupling efficiency of the piezoelectric platelet for converting electrical power into mechanical power and vice versa. Another example is the electromechanical coupling coefficient known in the art as '$k_{33}$', associated with rod-like structures such as Tonpiliz transducers, as an approximation.

The relationship between the mechanical Q of the transducer and therefore its fractional bandwidth $\Delta f/f_c$ 3 dB power points, and the electro-mechanical coupling constant $k_t$ is given by:

$$Q = \frac{f_c}{\Delta f} = \frac{\pi}{4k_t^2} \frac{z_T}{z_S} \qquad (2)$$

where $f_c$ is the centre frequency of the transducer, $\Delta f$ is the frequency bandwidth (half power) of the transducer, $Z_T$ is the electrical input impedance of the transducer, and $Z_S$ is the source output impedance of the electrical power source.

The $k_t^2$ dependence is expected to apply for rod-like structures such as Tonpiliz transducers, as an approximation. Hence, it may be beneficial to replace current high power PZT ceramic piezoelectric materials with a k of ~0.65 (Meggitts Pz189 grade PZT) with a single crystal of PMN-PZT which has a '$k_{33}$' of ~0.88 (for a higher temperature capable type). Hence, replacing a Pz189 grade PZT for a single crystal PMN-PZT would allow the fractional bandwidth of the transducer to be improved by a factor of $\sim(0.9/0.65)^2 \sim 1.83$. This would be a considerable improvement.

The acoustic impedance of a medium is defined to be the product of its density and acoustic velocity, and is a direct analogue of electrical impedance and has similar relationships. This implies that the acoustic impedance mismatch of the transducer should be made as low as possible relative to the medium into which acoustic waves are being launched.

As an illustrative example, consider a 36° Y cut lithium niobate transducer which has an electromechanical coupling constant $k_t$ of 0.487 for longitudinal acoustic wave generation. If the lithium niobate transducer is electrically tuned to be electrically perfectly matched to its electrical power source, i.e. $Z_T = Z_S$, then the expected fractional bandwidth for the transducer 3 dB power points, is only 30%. The energy stored in the system, and thus the Q of the structure, is minimised by increasing the power loss of the structure (i.e. mechanical damping). In other words, the Q of the structure is minimised by increasing coupling of power into the transmission medium.

The invention aims to provide an improved transducer with desirable fractional bandwidth characteristics.

The present innovation for increasing the bandwidth of a bulk acoustic wave transducer comprises arranging an acoustically thin intermediate layer, in this example a cavity arranged to receive a fluid, between the active element, for example the piezoelectric platelet, and the acoustic coupling layer and hence the main substrate (for example, the transmission medium) into which sound is being launched. An acoustically thin layer may be a layer of material having an acoustic thickness much less than the acoustic wavelength ($\wedge$) in the medium in question. This is a surprising result. It is not an obvious outcome that a large increase in the matched bandwidth of the transducer can be achieved by adding an acoustically thin (e.g. semi-reflective) intermediate layer (i.e. the cavity), particularly if the acoustic impedance of the intermediate layer (i.e. the cavity) is either lower than, or alternatively larger than the acoustic impedances values of both active element, for example the piezoelectric layer, and the main substrate (for example, the transmission medium). The addition of such an intermediate layer (i.e. the cavity) to the transducer structure is particularly effective when the acoustic impedance of the piezoelectric layer is lower than that of the main substrate. It should be understood that a thickness of the acoustically thin intermediate layer (i.e. the cavity) is at least a displacement, in use, of the active element.

In use and/or at least in use, the cavity comprises the fluid, for example the cavity is at least partly filled with the fluid, for example completely filled with the fluid.

According to current wisdom in the art, such an intermediate layer (i.e. the cavity) should slightly impede the coupling of acoustic energy out of the active element (for example, the piezoelectric medium) into the bulk acoustic medium (i.e. the transmission medium). This is illustrated by the observation that the power reflection coefficient (R) of an acoustic wave incident at normal incidence to a boundary between two media of acoustic impedances $Z_1$ and $Z_2$ respectively, upon moving from medium 1 to medium 2, is given by:

$$R = \frac{(Z_2 - Z_1)^2}{(Z_1 + Z_2)^2} \qquad (3)$$

The power transmission coefficient (7) of an acoustic wave incident at normal incidence to a boundary between the two media is given by:

$$T = \frac{4Z_1 Z_2}{(Z_1 + Z_2)^2} \qquad (4)$$

Therefore the best acoustic coupling between the active element, for example the piezo-electric transducer, and the transmission medium would usually be achieved when the two media have nominally identical impedances. That is to say, the condition under which R=0 and T=1. Consequently one would expect a reduction in performance and in the frequency bandwidth of the transducer by introduction of the intermediate layer (i.e. the cavity). The opposite has been found. Note that one can ignore the impact on the total reflectivity, arising from the presence of any acoustically extremely thin bonding layers in the structure, and which may be optionally present in embodiments or aspects of the invention. The acoustic intermediate layer (i.e. the cavity) may also be referred to as a 'buffer layer'.

Current wisdom is based on the following considerations. When two adjacent media have a large acoustic impedance mismatch, for example $Z_1 \gg 2Z_2$ or alternatively $Z_2 \gg 2Z_1$, efficient coupling of acoustic waves between the two media can be facilitated by inserting at the interface between the two media a third medium, for example a homogeneous and/or an isotropic medium, with an acoustical thickness of $(2n+1)\wedge/4$ where $\wedge$ is the acoustic wavelength within the layer, and n is either 0 or a positive integer. The acoustic impedance $Z_i$ of the intermediate layer is then ideally selected to be:

$$Z_i = \sqrt{(Z_1 Z_2)} \qquad (5)$$

The optimal thickness of $(2n+1)\wedge/4$ is valid for an acoustic wave incident at normal incidence to the interface of the two main media. Under these circumstances, the acoustic impedance matching between the layers is optimal at the acoustic frequency where the thickness of the intermediate layer is equal exactly to an odd-integer multiple of one quarter of an acoustic wavelength. This may be appropriate for a conventional material. However, a different thickness may be preferred for acoustic meta-materials, as described below.

According to the 'impedance translation theorem', the combined power reflection coefficient $R_e$ of two closely spaced interfaces due to an intermediate layer of acoustic impedance $Z_3$ that is sandwiched between the two main acoustic media of acoustic impedance $Z_1$ and $Z_2$, is given by:

$$R = \frac{(Z_{layer} - Z_1)}{(Z_{layer} + Z_1)} \frac{\overline{(Z_{layer} - Z_1)}}{\overline{(Z_{layer} + Z_1)}} \quad (6)$$

Where the overhead bar represents the complex conjugate, and where $Z_{layer}$ is the effective acoustic impedance arising from the finite thickness of the intermediate layer and the termination impedance $Z_2$ behind it. Provided that the acoustic attenuation in the intermediate layer is small, the effective load acoustic impedance, $Z_{layer}$, arising from the intermediate layer (i.e. the cavity) is given by the expression:

$$Z_{layer} = Z_3 \left\{ \frac{Z_2 \cos(k_{Layer} L) - i Z_3 \sin(k_{Layer} L)}{Z_3 \cos(k_{Layer} L) + i Z_2 \sin(k_{Layer} L)} \right\} \quad (7)$$

And $k_{layer}$ is the acoustic k vector given by:

$$k_{layer} = \frac{2\pi}{\Lambda} = \frac{2\pi f_a}{V_a} \quad (8)$$

Where $\Lambda$ is the acoustic wavelength, $f_a$ is the frequency of the acoustic wave, and $V_a$ is the acoustic velocity.

Equation 6, containing the term $Z_{layer}$, must be used to describe the effect of the intermediate layer between the piezoelectric platelet and the main acoustic medium unless the intermediate layer (i.e. the cavity) is acoustically extremely thin; typically $\ll \Lambda/10$ to $\ll \Lambda/100$ at the operational centre frequency. Equation 6 then reduces to the form of equation 3 as the thickness L of the intermediate layer (i.e. the cavity) tends to zero. The phase of the reflected acoustic wave from a material interface is dependent on the sign and value of the reflection coefficient r given by:

$$r = \frac{(Z_{layer} - Z_1)}{(Z_{layer} + Z_1)} \quad (9)$$

In the absence of an intermediate layer (i.e. the cavity) between a pair of media, the phase shift of the reflected acoustic wave relative to the incident acoustic wave is either 0° or 180°. If the incident acoustic wave is moving from a medium with low acoustic impedance to a medium with higher acoustic impedance, then the phase shift is 0°. A phase shift of 180° for the reflected acoustic wave occurs for the reverse case of the incident acoustic wave going from a high acoustic impedance medium into a low acoustic impedance medium.

Unlike the case of a simple interface between two media, the presence of an intermediate layer (i.e. the cavity) between two, for example a pair, of media yields a frequency dependent phase shift between the incident acoustic wave and the retro-reflected acoustic wave. This phase shift varies with frequency, and is a function of both the thickness of the buffer layer, and the acoustic impedances of the three materials making up the two interfaces. The phase shift of the reflected wave is determined by equation 9 which is a function of the complex variable parameter $Z_{layer}$.

Thus, the current wisdom in the art is that the presence of such an intermediate layer will add very significant complications to the optimal performance of the acoustic transducer, with no expectation of improving the bandwidth of the transducer in operation. The present invention contradicts current wisdom by demonstrating that significant enhancements can be made to the transmission bandwidth of an acoustic transducer when an intermediate (buffer) layer is added according to certain conditions.

Improvements in the fractional frequency bandwidth may be obtained/revealed due to an intermediate part (buffer layer) when the Smith Chart plot of the electrically impedance matched transducer's electrical response in the absence of a intermediate part does not yield a loop or kink in the Complex impedance response as plotted on the Smith Chart. The absence of a kink or loop in the Smith Chart plot may often occur, for example, when the acoustic impedance of the piezoelectric layer is either less than or alternatively equal to the acoustic impedance of the substrate. Significant improvements in the electrically matched bandwidth may be achieved when the addition of an intermediate part excites a kink, or better still a small loop, in the electrically matched transducer's Smith Chart response. Examples of this effect are for example illustrated in Figures herein and described below. The cavity is preferably acoustically thin (e.g. of thickness<<one acoustic wavelength within the part).

Fluid

Generally, tensile forces may not be transferred via the fluid, for example a liquid and/or a gas. In contrast, as will be understood by the person skilled in the art, some compressive forces may generally be transferred via the fluid. A fluid reservoir may be provided wherein the cavity is in fluid communication with the fluid reservoir. In this way, fluidic coupling between the active element and the acoustic coupling layer may be reduced. For example, if in use the fluid is unable to flow, for example easily, between the active element and the acoustic coupling layer, then effectively these two parts would be strongly coupled, which in turn may mean that a mass of the acoustic coupling layer would couple to that of the active element, affecting its mechanical Q adversely. Additionally and/or alternatively, if in use the fluid, for example a liquid, is unable to flow, for example easily, between the active element and the acoustic coupling layer, at high acoustic powers and high operational frequencies, there is a risk of cavitation, in which liquid vapour bubbles are created. Cavitation may be highly undesirable because such bubbles may be acoustically highly reflective). In this way, a volume of the fluid in the cavity may vary, for example due a change in size of the cavity such as due to relative movement of the active element and the acoustic coupling layer. Additionally/and or alternatively, a mass of the fluid in the cavity may vary, for example due to change in temperature and/or pressure of the fluid. In one example, the transducer comprises a fluid reservoir in fluid communication with the cavity. In one example, the cavity is in fluid communication with the transmission medium, such that the transmission medium provides a fluid reservoir, in use.

Generally, the fluid may be a gas or a liquid. In one example, the fluid is a liquid. The fluid may be provided in the cavity or the cavity may be subsequently at least partly filled with the fluid. In one example, the cavity comprises a first fluid which is replaced by a second fluid.

The fluid may be a high voltage dielectric fluid to hold off high voltages used to drive the transducer at maximum acoustic power output levels while allowing hydrostatic balancing of the fluid pressures between the transmission medium and the internal structure of the transducer.

It should be understood that the fluid is non-adhesive, so as to reduce mechanical and/or structural coupling between the active element and the acoustic coupling layer. That is, the fluid does not provide an adhesive bonding layer, for example between the active element and the acoustic coupling layer. Hence, gels or adherent greases, for example may be undesirable.

In one example, the fluid comprises a liquid, for example a flowable liquid. In one example, a dynamic viscosity of the liquid is from 0.01 to 10,000 centipoise, preferably from 0.1 to 1000 centipoise, more preferably from 0.1 to 100 centipoise. The dynamic viscosity may be measured at 20° C., for example using a Brookfield Dial Reading Viscometer model LV, RV or HA in accordance with the manufacturer's instructions.

In one example, the liquid is selected to provide a desired dynamic viscosity, for example according to the transmission medium.

In one example, the fluid comprises the transmission medium, in use. The transmission medium may be water, for example sea water. For example, the fluid may be initially a gas (i.e. a first fluid), for example air, and subsequently replaced, at least in part or completely, by a liquid (i.e. a second fluid), for example water such as sea water.

Acoustic Meta-Material

In one example, the acoustic coupling layer comprises an acoustic meta-material, for example a binary grating (also known as a 2D grating).

Acoustic impedance matching meta structures (acoustic meta-structures, also known as acoustic meta-materials) may provide improved coupling of sound from the transducer to the transmission medium, for example a fluid transmission medium. Generally, the acoustic meta-structures have anisotropic properties, for example anisotropic acoustic properties. These acoustic meta-structures may provide an anti-reflection effect that reduces the mechanical Q of the transducer, for example a Tonpliz transducer, and thus enhance its fractional bandwidth. Furthermore, these acoustic meta structures may be less susceptible to cavitation-induced delamination of for example adhesive bonds that may be observed in conventional metal-fluid impedance matching structures based on isotropic and/or homogeneous materials, for example polymethyl methacrylate (PMMA).

Advantageously, anti-reflection meta-structures (i.e. the acoustic meta-material) for Tonpilz transducers may improve acoustic coupling of acoustic power into the transmission medium, for example seawater, and thus reduce overall mechanical Q. This in turn would improve fractional bandwidths of the Tonpilz transducers. The relatively lower operating frequencies of a Tonpilz transducers (typically less than 80 kHz) may mean that accurate forming of the acoustic meta structure may be less demanding than that required for transducers intended to operate at ultrasonic frequencies, for example 3.3 MHz. Particularly, the acoustic meta-material is in itself advantageous for Tonpilz transducers, even in absence of the cavity. Additionally and/or alternatively, the acoustic anti-reflection properties of the acoustic meta-material may also improve signal reception of a return echo, because less power will be lost through acoustic reflections due to an acoustic impedance mismatch between the transducer and fluid medium.

In one example, the acoustic meta-material comprises acoustic elements having sub-wavelength separations between adjacent acoustic elements to prevent the excitation of $1^{st}$ order diffraction orders in the lowest acoustic velocity medium. Generally the separations should be sub-wavelength since if the meta-material has a periodic structure, acoustic diffraction lobes off the periodic structure will be excited, starting in the material with the lowest acoustic velocity where $1^{st}$ order diffraction off the effective grating will commence at a lower frequency. More specifically, a separation of periodic features should be less than ½ $\Lambda$ in the lowest velocity medium (generally the transmission medium). If the spacing of the elements is periodic and greater than $\Lambda$ in an encapsulant arranged to encapsulate the acoustic meta-material and/or the acoustic elements (generally this will be the material with the lowest acoustic velocity, and therefore the smallest wavelength) then 1st order diffraction beams will be generated. The acoustic elements may also be less than one wavelength $\Lambda$ apart in the transmission medium domain even if encapsulated, otherwise 1st order diffraction beams will be excited in the transmission medium domain.

In one example, an acoustic impedance of the acoustic coupling layer changes in a longitudinal direction away from the cavity. In this way, acoustic coupling of the electroacoustic transducer and the transmission medium is improved.

In other words, the acoustic impedance of the acoustic coupling layer may change in a longitudinal direction away from the active element.

In one example, an acoustic impedance of the acoustic coupling layer changes in a transverse direction.

In this way, acoustic lensing and/or beam steering may be provided. For example, by providing the acoustic coupling layer as two prismatic structures, such as Risley prisms, that hence change the acoustic impedance of the acoustic coupling layer in the transverse direction independent rotation thereof may provide beam steering.

In one example, a thickness of the acoustic coupling layer corresponds to $(2n+1)\Lambda/4$ where $\Lambda$ is the acoustic wavelength within the acoustic coupling layer, and n is either 0 or a positive integer. In this way, where the acoustic coupling layer comprises and/or is an isotropic and/or homogeneous material, for example having an acoustic impedance at a value intermediate in value between the acoustic impedance of the active element and the acoustic impedance of the transmission medium, more specifically ideally equal to square root of the product of the acoustic impedances of the fluid medium and the active element. The anti-reflection layer needs to be $(2n+1)\Lambda/4$ thick because the reflected acoustic beams of each interface suffer identical phase changes upon reflection.

In one example, a thickness of the acoustic coupling layer corresponds to $(n+1)\Lambda/2$ where $\Lambda$ is the acoustic wavelength within the acoustic coupling layer, and n is either 0 or a positive integer. In this way, where the acoustic coupling layer comprises and/or is anisotropic (and/or inhomogeneous) acoustic coupling layer, for example a binary grating. In the latter case of a 'binary' meta-material, there is a 180 degree relative phase change upon reflection from one of the two nominal reflection planes of the metamaterial structure. Therefore the structure preferably has a thickness of $(n+1)\Lambda/2$, so that reflected acoustic beams off each interface are 180° out of phase.

The inventors have determined that from acoustic reflectivity versus frequency results obtained experimentally with a titanium patterned square pillar structure, as described herein, that a first frequency-dependent effect as frequency is increased is appearance of a partial mirror effect at ~3.5 MHz (3.5 MHz was the original target frequency for which an AR effect was being sought). At higher frequencies, a partial anti-reflection effect begins to appear. This outcome of first a reflection effect followed by an anti-reflection effect at higher frequencies requires a relative 180° phase change at one the two nominal reflection planes of the structure.

In one example, corresponding to the case of tapered structures within the acoustic meta-material matrix, a thickness of the acoustic coupling layer corresponds to $m/\wedge$ where $\wedge$ is the acoustic wavelength within the transmission medium (for example, the fluid) or an encapsulant (for example, butyl rubber) in the acoustic coupling layer, and m is a positive real number greater than 0.9.

In one example, the acoustic coupling layer comprises a porous structure. Examples of porous structures include porous materials and structures having perforations therethrough. Porous structures may be formed from metals and plastics materials by machining, investment casting, 3D printing and other such processes.

In one example, the porous structure comprises open pores, for example wherein at least 90% of a total pore volume is provided by open pores. In one example, 100% of the total pore volume is provided by open pores. The open pores may be interconnected pores, for example, the open pores are in mutual fluid communication. In one example, the porous structure consists of open pores. In one example, the open pores are in fluid communication with the transmission medium, in use. In this way, the transmission medium may fill the open pores, for example, thereby improving acoustic coupling by, at least in part, improving matching of acoustic impedances. In one example, the open pores are in fluid communication with the cavity. In one example, the open pores are in fluid communication with the transmission medium and the cavity, in use. In this way, the transmission medium may fill the open pores, for example, thereby improving acoustic coupling by, at least in part, improving matching of acoustic impedances. In one example, the open pores are in fluid communication with the cavity.

In one example, a porosity, for example a mean porosity, of the porous structure is in a range from about 5% to about 90% by volume across the thickness of the porous structure in the propagation direction of the main acoustic beam. In this way, a mass of the acoustic coupling layer may be reduced.

In one example, the porosity changes in a longitudinal direction. For example, the porosity of the porous structure may increase in a direction extending away from the cavity. In one example, a first region of the porous structure proximal the cavity has a first porosity and a second region of the porous structure distal the cavity has a second porosity, wherein the first porosity is less than the second porosity. In this way, an acoustic impedance of the acoustic coupling layer may change, for example progressively change and/or decrease, in the longitudinal direction.

In one example, a density of the acoustic coupling layer changes in a longitudinal direction. For example, the density of the acoustic coupling layer may decrease in a direction extending away from the cavity. In one example, a first region of the acoustic coupling layer proximal the cavity has a first density and a second region of the acoustic coupling layer distal the cavity has a second density, wherein the first density is greater than the second density. In this way, an acoustic impedance of the acoustic coupling layer may change, for example progressively change and/or decrease, in the longitudinal direction.

In one example, the acoustic coupling layer comprises a plurality of acoustic coupling members. The acoustic coupling members may be mutually spaced apart, for example mutually equispaced apart. The acoustic coupling members may be arranged regularly or irregularly. The acoustic coupling members may be arranged in an array or a grid, for example a periodic array or uniformly spaced array such as a square array, or an aperiodic array or nonuniformly spaced array such as a circular array.

The provision of such acoustic coupling members tends to mitigate reflection loss between media of different acoustic impedances. In turn, the mitigated reflection losses tend to widen the fractional bandwidth.

Consequently, more design flexibility is provided where choosing a material of the acoustic coupling members. Further, more design flexibility is offered in choosing a thickness of acoustic coupling layer. In particular, greater thicknesses of the acoustic coupling layer may be provided without significantly reducing the fractional bandwidth offered by the transducer.

Thus, by providing the acoustic coupling members, the transducer is capable of providing a wideband operation.

In one example, a length of an acoustic coupling member of the plurality of acoustic coupling members corresponds to a thickness of the acoustic coupling layer, as described above. In one example, the plurality of acoustic coupling members have the same length.

The length of the acoustic coupling member may govern a centre frequency that is optimally coupled with the transmission medium, for example from a Tonpliz transducer's vibrating head mass into water.

In one example, the acoustic coupling members comprise elongate acoustic coupling members, having aspect ratios of at least one, preferably at least 3, more preferably at least 10. The aspect ratio may be a ratio of a length of an acoustic coupling member to a width, for example a width of a base, of the coupling member.

In one example, the plurality of acoustic coupling members are arranged in a longitudinal direction.

For example, the acoustic coupling members may comprise binary protrusions, each acoustic coupling member extending generally transversely and/or perpendicularly from the cavity and having a generally constant and/or constantly-shaped cross section.

For example, the acoustic coupling members may have the form of rods or pillars having constantly-shaped cross sections i.e. constant cross-sectional areas along the entire length of the acoustic coupling member. These acoustic coupling members may provide a binary grating. A cross sectional shape may be polygonal, for example having three or more sides, or oval, for example circular. Other shapes may be provided. Such acoustic coupling members may reduce transmission losses.

The applicant has determined that such acoustic coupling members may improve, for example optimise, a reduction of transmission loss.

In one example, the acoustic coupling members taper in the longitudinal direction. In this way, an acoustic impedance of the acoustic coupling layer may change, for example progressively change and/or decrease, in the longitudinal direction. In one example, the acoustic coupling members taper linearly, for example a rate of taper is constant, thereby providing a non-linear change in acoustic impedance as a function of distance in the longitudinal direction. For example, the acoustic coupling members may have straight sides, such as pyramidal or conical or frustoconical acoustic coupling members, in which a width or diameter of the acoustic coupling members varies linearly in the longitudinal direction. In one example, the acoustic coupling members taper non-linearly, for example a rate of taper may increase or decrease in the longitudinal direction. For example, the acoustic coupling members may have curved sides. In one example, the acoustic coupling members taper continuously, for example smoothly. In one example, the acoustic coupling members taper discontinuously, for example the acoustic coupling members may comprise one or more steps. The tapered change in cross-section of the protrusion, and thus acoustic impedance, can suppress the periodic variation in acoustic reflections. Such suppression may not be offered by the protrusions having constant cross-sectional area.

In one example, the acoustic coupling members comprise multi-step protrusions, each multi-step protrusion having a first step extending generally perpendicularly from the cavity, the first step having a first shaped cross section, the first shaped cross section being generally constantly-shaped along the axis of the extension and having a second step extending from the first step, the second step having a second shaped cross section, the second shaped cross section being generally constantly-shaped along the axis of the extension, the second step having a smaller cross sectional area than the first.

In one example, the acoustic coupling members comprise tapered acoustic coupling members, each tapered acoustic coupling member extending from the cavity and having a base with a first cross section shape, and extending along the axis of the extension from the base to a second cross-section shape, and continuously tapering between the base and the second section shape.

Depending on the manufacturing process employed to form the acoustic coupling members, it may be more convenient to form tapered acoustic coupling members rather than stepped acoustic coupling members (and vice versa).

The tapered change in cross-section of the acoustic coupling members, and thus acoustic impedance, may suppress the periodic variation in acoustic reflections. Such suppression may not be provided by the acoustic coupling members having constant cross-sectional area. Provided the acoustic coupling members are sub-wavelength in separation, in the acoustic far field the corrugations effect will not be apparent.

In one example, the acoustic coupling members are substantially mutually adjacent. In one example, the acoustic coupling members are arranged to tessellate. A perforation and/or a plurality of perforations, for example small open access holes, may be provided through a base of the tessellated acoustic coupling members to facilitate encapsulation (also known as potting) of the acoustic coupling members with, for example, an elastomeric material such as butyl rubber, by providing an exit route for otherwise trapped air during manufacture.

In one example, an acoustic coupling member of the plurality of acoustic coupling members tapers to a point. In one example, each of the plurality of acoustic members tapers to a point.

The applicant has determined that such protrusions may reduce transmission loss, particularly where bases of the acoustic coupling members are either square or equilateral triangles and arranged to tessellate.

Encapsulant

In one example, the transducer comprises an encapsulant, arranged to encapsulate the acoustic meta-material. For examples, pores and/or voids and/or spacings in the acoustic meta-material may be at least partly filled, preferably completely filled, with the encapsulant. For example, where the acoustic meta-material comprises a porous material, open pores in the porous material may be completely filled with the encapsulant. For example, where the acoustic meta-material comprises a plurality of acoustic coupling members such as rods, spacings between the acoustic coupling members may be completely filled with the encapsulant. In one example, the encapsulant comprises a material selected to have a comparable acoustic impedance to the transmission medium and hence typically a low acoustic impedance, for example an elastomeric material such as butyl rubber. In this way, acoustic coupling between acoustic meta-material and the transmission medium may be maintained, while the acoustic meta-material structure's resistance to corrosion and/or resistance to mechanical impact or shock loading, in use may be improved.

Housing

In one example, the transducer comprises a housing, for example a shroud, having a wall arranged to surround, at least in part, the acoustic coupling layer. In one example, the wall is arranged to surround transverse sides of the acoustic coupling layer. In one example, the housing has an open end, for example distal the cavity. In one example, the housing has two opposed open ends.

In this way, the housing may, at least in part, channel sound emission through the acoustic coupling layer, for example, through the acoustic meta-material.

In one example, the housing is arranged to support, for example mechanically and/or structurally support, the acoustic coupling layer. A frame may be provided, for example, to support the acoustic coupling layer. In this way, shock loadings during for example the system deployment phase may be withstood. In one example, the housing is arranged to support the acoustic coupling layer spaced apart from the active element, thereby providing the required fluid filled cavity. For example, the housing may be arranged to support the acoustic coupling layer spaced apart from the active element by an acoustically (<<wavelength) small distance from the vibrating head mass of a Tonpilz transducer. This prevents direct inertial mass loading of the head mass structure.

In one example, the housing defines a cylindrical housing having a diameter in a range from about 1 to about 2.5 times a diameter of the active element.

In one example, the housing defines a cylindrical housing having a diameter in a range from about 25 mm to about 125 mm, preferably about 40 mm to 60 mm, for example 52 mm. The diameter of the housing may affect a low frequency cut-off of the transducer.

Generally, a head mass of a conventional Tonpilz transducer provides either a round or square front surface. In one example, the wall of the housing is arranged to surround, at least in part, transverse sides of the head mass.

The head mass diameter for a circular piston shape, or the aperture dimensions for a rectangular piston shape for a conventional Tonpilz transducer head governs an angular diffraction required to provide a required scan angle over which a transducer array will operate. This scan angle should be illuminated by a diffraction central lobe of each individual transducer since otherwise, little or no power may be directed in the direction of interest. This diffraction effect may govern a minimum diameter required for the head mass and/or the housing and should be calculated for the highest frequency of interest.

In one example, a wall thickness of the wall is in a range from about 1 mm to about 10 mm, preferably from about 4 mm to about 10 mm. The wall thickness may affect resonant frequency of the housing. Alternatively the wall could be formed by apertures in a metal front plate of thickness 5 to 20 mm within which the front face sound emitting surface of the transducer is recessed.

In one example, a fill ratio, for example a mean fill ratio, of the housing by the acoustic coupling layer is in a range of from about 5% to about 90% by volume, for example internal volume, of the housing. Where the acoustic coupling layer comprises a porous structure wherein the porosity changes in a longitudinal direction or tapering acoustic coupling members, for example, the fill ratio may change in a longitudinal direction.

The fill ratio may determine an effective average acoustic impedance of the acoustic meta-material.

In one example, a fill ratio of the housing changes in a longitudinal direction. For example, the fill ratio of the housing may decrease in a direction extending away from the cavity. In one example, a first region of the housing proximal the cavity has a first fill ratio and a second region of the housing distal the cavity has a second fill ratio, wherein the first fill ratio is greater than the second density. For example, the first fill ratio may be in a range of from 80% to 100% and the second fill ratio may be in a range of from 0% to 20%. In this way, an acoustic impedance of the acoustic coupling layer may change, for example progressively change and/or decrease, in the direction extending away from the cavity. Generally for transmitting sound in to a transmission medium such as water, for example, it is preferable that the acoustic impedance decreases progressively in the direction extending away from the cavity, that is in the direction towards the fluid media into which sound is being launched.

In one example, a shape of the housing is arranged to support longitudinal vibration Eigen-frequency modes. In this way, the transducer may provide a plurality of closely spaced natural resonant modes to support wide bandwidth performance. For example, a shallow s-shape may support longitudinal vibration Eigen-frequency modes of the housing. Alternatively, a kinematic hinge structure around a circumference of the housing may be provided for the same Eigen-frequency vibration mode role.

Tonpilz Transducers

In one example, the transducer is a Tonpilz transducer.

Generally, Tonpilz transducers are highly resonant mechanical structures intended to generate the high acoustic powers required for power projection by an active sonar system.

Tonpilz transducers (also known as acoustic mushrooms) generally refer to certain types of underwater electroacoustic transducers. By sandwiching active materials (for example, piezoelectric and/or magnetostrictive materials and/or other materials as described herein) between a light, stiff radiating head mass and a heavy tail mass, a Tonpilz transducer may operate as either a projector (underwater acoustic source) or a hydrophone (underwater acoustic receiver). The transducers size, odd shape, and acoustic projection capabilities have earned it the moniker 'tonpilz' from the German words Ton (tone) and Pilz (mushroom) and from the figurative similarity. Typically, tonpilz transducers are used in sonar applications. To maximize efficiency, transducers are often placed in arrays: a grid of sometimes hundreds of transducers. This arrangement also allows beamforming and steering. Transducers of this form also lend themselves to compensation against the hydrostatic pressures encountered in sonar, particularly for submarine applications The Tonpilz transducers are usually designed for power rather than bandwidth. Typically, Tonpilz transducers are intended for operation at centre frequencies in the range of 25 kHz to 35 kHz, and for the 25 kHz designs typically are tuned up to have a mechanical Q of 3 to 5 with at least 6 to 7 kHz bandwidth. Tonpilz transducers operating up to about 80 kHz are possible, but this frequency has in the past been the top limit on the centre frequency for this type of transducer.

FIG. 2A schematically depicts a conventional Tonpilz transducer 1, comprising a piston head mass 2, a tail mass 3, a piezoelectric stack 4 and a stress rod 5.

The piston head mass 2 (also known as head mass) provides the principal sound emitting surface (also known as the front surface) of the Tonpilz transducer 10, and in general is made as lightweight as possible to reduce its inertia. Aluminium alloys are frequently used for this component. The tail mass 3 is normally made as heavy as possible to maximise its inertia to ensure sound is principally coupled out of the resonating Tonpilz transducer 10 via the sound emitting front surface of the head mass 2. The piezoelectric stack 13 (also known as the stack) provides, at least in part, an active element and hence the mechanically active part of the Tonpilz transducer 10 which is driven into vibration by a high voltage signal applied across the individual transducer discs that collectively make up the stack 13. Generally, the stack 13 comprises of set of annular piezoelectric elements that are stacked to provide a large net mechanical movement of the front surface of the head mass 2. The stress rod 5 is used to apply a compressive stress to the piezoelectric stack 13 to prevent the electrical driving voltage from exciting net tensile stresses in the piezoelectric ceramic or crystal stack 13. The stress rod 5 is generally made of a high tensile steel, but should be made as light as possible as it adds to the vibrating mass of the head mass. From a simplistic perspective, the compressive stress applied by the stress rod 5 should be set to a value that it halfway between the compressive stress failure and tensile stress failure points of the piezoelectric elements of the stack 13, and further offset by the half the compressive load arising from the external hydrostatic load of the maximum water depth at which the Tonpilz transducer 10 is required to operate. Generally the compressive stress failure point of a piezoelectric material is very much larger than its corresponding tensile stress failure point.

A primary vibration mode of the Tonpilz transducer 10 is a longitudinal vibration along its axis of symmetry. This mode of vibration tends to have limited bandwidth. The frequency bandwidth Δf of the Tonpilz transducer 10 is generally inversely proportional to the mechanical quality factor Q of the Tonpilz transducer 10, which for the Tonpilz transducer 10 is given according by:

$$Q_m \sim f_c/\Delta f \sim M_h/R_t \quad (10)$$

Where $M_h$ is the weight of the head mass 2 of the Tonpilz transducer 10, $R_t$ is the radiation resistance of the of the fluid (i.e. the transmission medium) into which the Tonpilz transducer 10 is emitting sound, Δf is the frequency bandwidth of the Tonpilz transducer 10, and $f_c$ is the centre frequency of the Tonpilz transducer 10. The frequency bandwidth of the Tonpilz transducer 10 may therefore be adjusted by either making the head mass $M_h$ of the Tonpilz transducer 10 as light as possible, or making its radiation resistance $R_t$ as large as possible. The latter may be achieved by making the sound emission area of the Tonpilz transducer 10 on its head mass 2 (i.e. the front surface) as large as possible, and hence the classic 'mushroom' shaped geometry of this transducer type.

A number of techniques have been previously proposed to improve frequency bandwidths of Tonpilz transducers.

FIGS. 2B and 2C schematically depict vibration modes of the Tonpilz transducer of FIG. 2A.

For example, multimode coupling of different vibration modes of the transducer structure may be exploited. In particular, the longitudinal and a first 'flapping mode of the head mass 2 structure may be combined. These two modes of vibration are illustrated in the schematic diagrams of FIGS. 2B and 2C, respectively. If the longitudinal and flapping head mass 2 vibration modes are sufficiently close as to partly overlap in their frequency responses, then the two modes of vibration become strongly coupled and overall bandwidth of the transducer is increased. Using this approach, fractional bandwidths of ~37.8% ($\Delta f$ ~13.3 kHz) of the centre frequency of ~35.1 kHz may be achieved.

FIGS. 3A and 3B schematically depict known Tonpilz transducers configurations designed to improve the fractional frequency bandwidth of a conventional Tonpilz transducer as illustrated in FIG. 2.

For example, multi-resonant structures, for example triple resonant structures, may be exploited for Tonpilz transducers. FIG. 3A shows a triple resonant structure 30A including a tail mass m1, a piezoelectric stack c1 followed by a pair of central masses m2, m3 separated by a compliant spring c2, followed by a further compliant spring c3 and finally a lightweight piston head m4 is used to radiate sound into the surrounding water. FIG. 3B shows another triple resonant structure 30B in including one of the additional central masses m2 and compliant springs c2, and also including a quarter-wave acoustic matching layer of poly methacrylate (PMMA) mass m4 and compliance c3 on the fluid side of the head mass m3. These triple resonant structures provide a wide bandwidth that spans ~13 kHz to 35 kHz by virtue of providing a sequence of well-spaced local longitudinal mode resonant frequencies. However the power generation flatness is relatively poor with pronounced peak responses centred on the individual resonance frequencies of the transducers, particular so for the structures without a ¼ wave matching layer. The predicted results exhibit sharper variations in the bandshape performance than the measured results, probably due to losses within the transducer structure, and such additional losses would naturally broaden the Q of the resonances.

For example, an overall density of the head mass may be reduced by using a hollow head, thereby reducing a mass of the head mass compared with a solid head mass.

In contrast to these previously-proposed techniques, the acoustically thin ($<<\lambda$) fluid filled cavity of the present invention separates the head mass and the acoustic coupling layer, which for example could be either a conventional material such as PMMA or an acoustic meta-material as described herein. This fluid filled cavity addresses several potential issues that may affect the performance of a Tonpilz transducer Firstly, mechanically and/or structurally coupling the acoustic coupling layer to the head mass may adversely affect the mechanical Q of the vibrating structure (Equation 10).

Hence, an increase in the effective head-mass, for example by the acoustic coupling layer, will increase the mechanical Q of the Tonpilz transducer and so in itself will reduce the bandwidth $\Delta f$ of the Tonpilz transducer's natural resonance.

Secondly, mechanically and/or structurally coupling the acoustic coupling layer to the head mass by bonding, for example using an adhesive layer, may result in adhesive delamination of the bond in use, when subject to the extremely high power outputs of an active sonar Tonpilz transducer.

Centre Frequency

In one example, a centre frequency f of the transducer is in a range from about 1 kHz to about 80 kHz, preferably 10 to 60 kHz, more preferably 20 to 50 kHz, for example 25, 30, 35 or 40 kHz.

Table 1 shows acoustic attenuation versus frequency in water. Due to the significant acoustic attenuation above 80 kHz, active long range sonar systems in seawater these higher frequencies may be inefficient. However, high frequency operation, such as above 80 kHz, might be beneficial for short range communications applications, for example for private and/or covert transmissions.

TABLE 1

Acoustic attenuation dB/km versus frequency in water at a temperature of 8° C., a salinity of 35 ppt, an operating depth of 50 meters, and an acidity of pH 8. Table data source: NPL website, using the algorithm of Ainslie and McColm (1998).

| Acoustic Frequency | Absorption Coefficient |
|---|---|
| 1 kHz | 0.06 dB/km |
| 10 kHz | 1.04 dB/km |
| 20 kHz | 3.6 dB/km |
| 25 kHz | 5.23 dB/km |
| 30 kHz | 7.27 dB/km |
| 35 kHz | 9.33 dB/km |
| 40 kHz | 11.4 dB/km |
| 50 kHz | 15.7 dB/km |
| 80 kHz | 26.5 dB/km |
| 100 kHz | 32.1 dB/km |

It is generally beneficial to reduce a centre frequency of the transducer while maintaining or increasing the frequency bandwidth, for example subject to noise considerations. This will improve an operational range of an active sonar transducer, for example. Although low frequency noise due to ambient sea state noise will increase as the frequency is reduced, the reduced acoustic attenuation over transmit and receive paths to/from the target will for long range targets will fall at an even faster rate.

Al—Be Alloy

In one example, the Tonpilz transducer comprises a head mass comprising an Al—Be alloy. Reducing the mass $M_h$ of the sound emitting head mass has been shown to be highly beneficial for a given sound emitting surface area (which determines $R_t$). This is because it reduces the mechanical Q of the transducer as given by equation 10.

The head mass of the Tonpilz transducer can be further reduced using a lighter weight alloy, namely AlBeMet 162, which is alloy of beryllium and aluminium. This material has a combination of low density, high electric modulus, and high heat capacity. Its key properties are summarised in Table 2 below.

Other advantages of AlBeMet 162 is that its coefficient of thermal expansion is substantially lower than aluminium, and would therefore be a better thermal expansion match to the Piezo-electric material to which it would be customarily bonded. Its heat conductivity is also higher than that of a conventional aluminium alloy, such as 6082-T6. However, corrosion resistance properties may be inferior to conventional aluminium alloys used for this application, and so better corrosion protection would be required.

TABLE 2

Comparison of Material Properties of AlBeMet
162 and Aluminium Alloy 6082-T6

| | AlBeMet 162 | Aluminium Alloy 6082-T6 |
|---|---|---|
| Density | 2.10 g/cc | 2.7 g/cc |
| Youngs Modulus | 193 GPa | 69 GPa |
| Longitudinal Acoustic Velocity | ~11,669 m/s | ~6,125 m/s |
| Acoustic Impedance (MRays) | 24.50 MRayls | 16.54 MRayls |
| Poissons Ratio | 0.33 | 0.33 |
| CTE @25° c. | 13.9 ppm/° C. | 23.1 ppm/° C. |
| Yield Stength | 276 MPa | 310 MPa |
| Thermal Conductivity | 210 W/m ° K | 172 W/m ° K |

The longitudinal acoustic velocity values (and thus the acoustic impedance values) in Table 2 were calculated using the well-known formula for the speed of a longitudinal wave:

$$C_L = \sqrt{\frac{E(1-\sigma)}{\rho(1-2\sigma)(1+\sigma)}} \quad (11)$$

where E is the Youngs Modulus, σ is Poisson's Ratio and ρ is density.

The extra-ordinary high velocity of AlBeMet 162 means that the acoustic thickness of the head is nearly half that of an aluminium head of the same geometric size. This in part compensates for AlBeMet 162's higher acoustic impedance which in itself would yield a higher acoustic reflectivity at the sea water-Tonpilz head interface.

Single Crystal Piezoelectric Material

In one example, the active element comprises a single crystal piezoelectric material.

The single crystal piezoelectric material may be provided by Solid State Single Crystal Growth (SSCG). This growth technique offers a route to more economic manufacture of single crystal piezo-electric substrates for sonar applications.

SSCG is a refinement of a method called Oswald ripening where heat is applied to facilitate the growth within the initial micro-crystalline structure of a conventional ceramic crystal of ever larger crystal grains. SSCG employs a single crystal slice as a seed facilitating this process. As such the microcrystals of the polycrystalline material progressively 'dissolve' and then re-crystallise on a single crystal growth front with the same orientation as the seed crystal. It is possible to use a seed crystal of a different crystal composition altogether to seed this growth process. A thin slice of BaTiO3 single crystal may be used as a seed to initiate the growth of a PMN-PT single crystal from a precursor block of PMN-PT polycrystalline ceramic.

The technique can also be used to convert a sintered ceramic annular ring of the type used in a Tonpilz transducer, from the polycrystalline precursor into a single crystal annular block.

According to the second aspect, there is provided a Tonpilz transducer comprising:
an active element; and
an acoustic coupling layer arranged to acoustically couple, in use, the active element to a transmission medium;
wherein the acoustic coupling layer comprises an acoustic meta-material.

The acoustic meta-material may be as described with respect to the first aspect. Particularly, as described above, by providing the acoustic meta-material as described above for a Tonpilz transducer, acoustic coupling may be improved even in absence of the cavity, for the reasons as described above. The acoustic meta-material may be coupled to or integrated with a head of the Tonpilz transducer. The Tonpilz transducer according to the second aspect may include any of the features as described for the transducer according to the first aspect.

According to the third aspect, there is provided an array comprising a plurality of transducers according to the first aspect and/or the second aspect.

Electroacoustic Transducer Array

According to the fourth aspect, there is provided an electroacoustic transducer array comprising a first electroacoustic transducer comprising a first active element and a second electroacoustic transducer comprising a second active element, wherein the electroacoustic transducer array comprises:
an acoustic coupling layer arranged to acoustically couple, in use, the first active element and the second active element to a transmission medium;
a first cavity arranged between the first active element and the acoustic coupling layer to receive a first fluid; and/or
a second cavity arranged between the second active element and the acoustic coupling layer to receive a second fluid;
whereby acoustic coupling of the electroacoustic transducer array and the transmission medium is improved.

In other words, the fourth aspect provides an electroacoustic transducer array comprising a plurality of electroacoustic transducers comprising respective active elements, wherein the electroacoustic transducer array comprises:
an acoustic coupling layer arranged to acoustically couple, in use, the respective active elements to a transmission medium; and
a cavity arranged between the respective active elements and the acoustic coupling layer to receive a fluid;
whereby acoustic coupling of the electroacoustic transducer array and the transmission medium is improved.

The electroacoustic transducer of the first aspect comprises an active element and an acoustic coupling layer arranged to acoustically couple, in use, the active element to a transmission medium, wherein the electroacoustic transducer further comprises a cavity arranged between the active element and the acoustic coupling layer to receive a fluid.

In contrast to the electroacoustic transducer of the first aspect, while an electroacoustic transducer, such as the first electroacoustic transducer and/or the second electroacoustic transducer, of the fourth aspect comprises an active element as described with respect to the electroacoustic transducer of the first aspect, the electroacoustic transducer array instead comprises the acoustic coupling layer, the first cavity and the second cavity.

For example, the acoustic coupling layer, such as an acoustic meta-material, of the electroacoustic transducer array may be provided as a continuous and/or a contiguous layer across the electroacoustic transducer array. The first electroacoustic transducer and/or the second electroacoustic transducer may be spaced apart from an acoustic input surface of the acoustic coupling layer, thereby providing the first cavity and/or the second cavity respectively. In use, the first cavity and/or the second cavity are filled, for example completely filled, with the fluid, for example the transmission medium. In this way, acoustic coupling of the electroacoustic transducer array and the transmission medium is improved, as described similarly with respect to the electroacoustic transducer of the first aspect. By improving the acoustic coupling, for example an acoustic coupling efficiency of the electroacoustic transducer array to the transmission medium, for example water, range and/or power efficiency and/or range resolution performance may be improved. Additionally and/or alternatively, since the acoustic coupling layer is passive and itself does not require power, by improving the power efficiency as described above, electrical power requirements of the electroacoustic transducer array may be reduced while maintaining performance thereof.

It should be understood that the electroacoustic transducer array may comprise any number N of electroacoustic transducers, where N is a positive real number of at least 2 (i.e. a plurality of electroacoustic transducers). That is, the electroacoustic transducer array is not limited to comprising only the first electroacoustic transducer and the second electroacoustic transducer.

Typically in sonar arrays used to generate directed acoustic beams in a direction of interest, for example to track a target, individual transducers are located in typically a honeycomb lattice pattern. By adjusting phases of signals applied to each transducer of the array, the complete array of transducers directs sonar energy in the direction of interest. In at least one sonar geometry, the sonar transducers elements are housed behind a front plate in which apertures, for example circular apertures, are provided to accommodate the vibrating circular piston head of each transducer. The front surface of the piston head is typically positioned close to flush with an outside surface of the plate within its individual aperture.

For example, sonar seekers typically consist of two dimensional (2D) electroacoustic transducer arrays which operate in a manner similar to phased array radars. Therefore, like phased array radars, multiple targets may be tracked if a frequency bandwidth of the transducers may be made sufficiently wide, for example to avoid the seekers being seduced by underwater decoys, for example by presenting false targets. Additionally and/or alternatively, use of frequency sub-bands or spread spectrum techniques may allow multi-salvo weapon release by reducing cross-weapon interference when used simultaneously.

Use of the acoustic coupling layer, for example comprising an acoustic meta-material, may boost fractional bandwidths by more than 50%. Use of additional techniques in conjunction with the acoustic meta-material, such as single crystal piezoelectric PMN-PZT actuators, as described previously, may further boost the fractional bandwidths to allow combined improvements of greater than an octave. The acoustic meta-material approach may have lower cost and complexity compared with single crystal piezoelectric transducers, using for example using PMN-PZT.

The acoustic coupling layer increases coupling by acting as an anti-reflection coating with a length and impedance chosen so that acoustic reflections from surfaces of the acoustic coupling layer, for example from the first electroacoustic transducer and/or the second electroacoustic transducer and ocean ends thereof, have the same amplitude and are in anti-phase and cancel. Other implementations are possible. For example, if the acoustic coupling layer comprises an acoustic meta-material comprising rods having conical structures, impedance smoothly changes from one end (i.e. a surface) of the acoustic coupling layer to the other end (i.e. an opposed surface), providing enhanced coupling through a 'moth-eye' like structure. Such tapered structures may provide a wide frequency bandwidth response.

As described previously with respect to the first aspect, it is undesirable to add inertia to a head-masses of electroacoustic transducers, which adversely alter mechanical resonance properties to yield higher mechanical Q structures. As described previously with respect to the first aspect, a mass of the acoustic coupling layer, for example comprising an acoustic meta-material, is decoupled from the first electroacoustic transducer and/or the second electroacoustic transducers via the first cavity and/or the second cavity respectively, which for example provide water disc separators in use. Provided a thickness of the first cavity and/or the second cavity is far smaller than an acoustic wavelength, for example the acoustic wavelength in the fluid in the first cavity and/or the second cavity, it has been found by both computational modelling and experimental measurements on conventional platelet transducers to have no significant adverse impact on frequency responses of the first electroacoustic transducer and/or the second electroacoustic transducers. That is, the first cavity and/or the second cavity, in use filled with the fluid, provide acoustically thin impedance mismatched layers that may increase the frequency bandwidth performance of the first electroacoustic transducer and/or the second electroacoustic transducers.

Since the electroacoustic transducer array comprises the acoustic coupling layer, such acoustic coupling layers may be provided as a retrofit for existing electroacoustic transducer arrays that do not comprise such an acoustic coupling layer. Retrofit may be simplified in that the acoustic coupling layers primarily increase thicknesses of front plates of the existing electroacoustic transducer arrays.

Additionally and/or alternatively, the acoustic coupling layer supports acoustic diffraction patterns originating from both axial and non-axial electroacoustic transducers, for example adjacent electroacoustic transducers. For example, a same volume of acoustic meta-material may support the acoustic diffraction profiles that originate on adjacent transducers. The problem this solves is that for an array, the acoustic diffraction pattern of each individual transducer must exceed the angular coverage required by the phased array. By comparison, the housings described with respect to the first aspect may potentially interfere with this required diffraction spreading aspect needed to support a wide field of view sonar array.

Generally, the first electroacoustic transducer and/or the second electroacoustic transducer of the fourth aspect may be as otherwise described with respect to the electroacoustic transducer of the first aspect. Generally, the acoustic coupling layer, the first cavity and/or the second cavity may be as otherwise described with respect to the acoustic coupling layer and/or the cavity of the first aspect. These and other features are described below in more detail, with reference to the first aspect for brevity, as appropriate.

In one example, the first fluid and/or the second fluid comprises the transmission medium, in use. The first fluid and/or the second fluid may be as described with respect to the fluid according to the first aspect. Generally, tensile forces may not be transferred via the first fluid and/or the second fluid, for example a liquid and/or a gas. In contrast, as will be understood by the person skilled in the art, a least a part of compressive forces may generally be transferred via the first fluid and/or the second fluid. A fluid reservoir may be provided wherein the first cavity and/or the second cavity is in fluid communication with the fluid reservoir. In this way, fluidic coupling between the active element and the acoustic coupling layer may be reduced. For example, if in use the first fluid and/or the second fluid is unable to flow, for example easily, between the first active element and/or the second active element and the acoustic coupling layer, then effectively these two parts would be strongly coupled, which in turn may mean that a mass of the acoustic coupling layer would couple to that of the first active element and/or the second active element, affecting their mechanical Qs adversely. Additionally and/or alternatively, if in use the first fluid and/or the second fluid, for example a liquid, is unable to flow, for example easily, between the first active element and/or the second active element and the acoustic coupling layer, at high acoustic powers and high operational frequencies, there is a risk of cavitation, in which liquid vapour bubbles are created. Cavitation may be highly undesirable because such bubbles may be acoustically highly reflective). In this way, a volume of the first fluid and/or the second fluid in the first cavity and/or the second cavity respectively may vary, for example due a change in size of the first cavity and/or the second cavity such as due to relative movement of the first active element and/or the second active element and the acoustic coupling layer. Additionally/and or alternatively, a mass of the first fluid and/or the second fluid in the first cavity and/or the second cavity may vary, for example due to change in temperature and/or pressure of the first fluid and/or the second fluid. In one example, the electroacoustic transducer array comprises a fluid reservoir in fluid communication with the first cavity and/or the second cavity. In one example, the first cavity and/or the second cavity is in fluid communication with the transmission medium, such that the transmission medium provides a fluid reservoir, in use. In one example, the electroacoustic array comprises a first passageway and/or a second passageway, arranged to fluidically couple the first cavity and/or the second cavity respectively with a fluid reservoir and/or the transmission medium in use. Generally, the first fluid and/or the second fluid may be a gas or a liquid. In one example, the fluid is a liquid. The first fluid and/or the second fluid may be provided in the first cavity and/or the second cavity respectively or the first cavity and/or the second cavity respectively may be subsequently at least partly filled with the first fluid and/or the second fluid. In one example, the first cavity and/or the second cavity respectively comprises a fluid which is replaced by another fluid. The first fluid and/or the second fluid may be a high voltage dielectric fluid to hold off high voltages used to drive the transducer at maximum acoustic power output levels while allowing hydrostatic balancing of the fluid pressures between the transmission medium and the internal structure of the transducer. It should be understood that the fluid is non-adhesive, so as to reduce mechanical and/or structural coupling between the first active element and/or the second active element and the acoustic coupling layer. That is, the fluid does not provide an adhesive bonding layer, for example between the first active element and the acoustic coupling layer. Hence, gels or adherent greases, for example may be undesirable. In one example, the first fluid and/or the second fluid comprises a liquid, for example a flowable liquid. In one example, a dynamic viscosity of the liquid is from 0.01 to 10,000 centipoise, preferably from 0.1 to 1000 centipoise, more preferably from 0.1 to 100 centipoise. The dynamic viscosity may be measured at 20° C., for example using a Brookfield Dial Reading Viscometer model LV, RV or HA in accordance with the manufacturer's instructions. In one example, the liquid is selected to provide a desired dynamic viscosity, for example according to the transmission medium. In one example, the first fluid and the second fluid are the same fluid. In one example, the first fluid and the second fluid comprises the transmission medium, in use. The transmission medium may be water, for example sea water. For example, the first fluid and/or the second fluid may be initially a gas, for example air, and subsequently replaced, at least in part or completely, by a liquid, for example water such as sea water.

In one example, the first cavity and the second cavity are separate cavities, for example, having no passageways therebetween and/or not directly in mutual fluid communication. In one example, the electroacoustic transducer array comprises an interconnecting passageway arranged to fluidically couple the first cavity and the second cavity. The electroacoustic transducer array may comprise a first passageway and/or a second passageway arranged to fluidically couple the first cavity and/or the second cavity respectively with a fluid reservoir and/or the transmission medium in use, as described above. In one example, the first cavity and the second cavity are provided by a single cavity.

In one example, the acoustic coupling layer comprises an acoustic meta-material, for example a binary grating (also known as a 2D grating). The acoustic coupling layer and/or the acoustic meta-material may be as described with respect to the acoustic coupling layer and/or the acoustic meta-material according to the first aspect.

In one example, an acoustic impedance of the acoustic coupling layer changes in a longitudinal direction away from the first cavity and/or the second cavity. In this way, acoustic coupling of the electroacoustic transducer and the transmission medium is improved.

In one example, a thickness of the acoustic coupling layer corresponds to $(2n+1)\Lambda/4$ where $\Lambda$ is the acoustic wavelength within the acoustic coupling layer, and n is either 0 or a positive integer. In this way, where the acoustic coupling layer comprises and/or is an isotropic and/or homogeneous material, for example having an acoustic impedance at a value intermediate in value between the acoustic impedance of the active element and the acoustic impedance of the transmission medium, more specifically ideally equal to square root of the product of the acoustic impedances of the fluid medium and the active element. The anti-reflection layer needs to be $(2n+1)\Lambda/4$ thick because the reflected acoustic beams of each interface suffer identical phase changes upon reflection. An example of such an acoustic coupling layer is polymethyl methacrylate (PMMA).

In one example, a thickness of the acoustic coupling layer corresponds to $(n+1)\Lambda/2$ where $\Lambda$ is the acoustic wavelength within the acoustic coupling layer, and n is either 0 or a positive integer. In this way, where the acoustic coupling layer comprises and/or is anisotropic (and/or inhomogeneous) acoustic coupling layer, for example a binary grating such as comprising constant thickness rods or bars. In the latter case of a 'binary' meta-material, there is a 180 degree relative phase change upon reflection from one of the two nominal reflection planes of the meta-material structure. Therefore the structure preferably has a thickness of $(n+1)\Lambda/2$, so that reflected acoustic beams off each interface are 180° out of phase.

In one example, corresponding to the case of tapered structures within the acoustic meta-material matrix for example, a thickness of the acoustic coupling layer corresponds to $m\Lambda$ where $\Lambda$ is the acoustic wavelength within the transmission medium (for example, the fluid) and/or the acoustic coupling layer such as an encapsulant (for example, butyl rubber) in the acoustic coupling layer, and m is a positive real number greater than 0.9, for example 0.91 or preferably 1.5.

In one example, the acoustic coupling layer comprises a porous structure. The porous structure may be as described with respect to the first aspect. Acoustic coupling layer comprising and/or consisting of an isotropic and/or homogeneous material, such as PMMA, are generally not porous structures.

In one example, a porosity of the porous structure is in a range from about 5% to about 90% by volume of the porous structure. In this way, a mass of the acoustic coupling layer may be reduced. The porosity of the porous structure may be as described with respect to the first aspect.

In one example, the porosity changes in a longitudinal direction. In this way, an acoustic impedance of the acoustic coupling layer may change, for example progressively change and/or decrease, in the longitudinal direction. The porosity of the porous structure may be as described with respect to the first aspect.

In one example, the acoustic coupling layer comprises a plurality of acoustic coupling members. The provision of such acoustic coupling members tends to mitigate reflection loss between media of different acoustic impedances. In turn, the mitigated reflection losses tend to widen the fractional bandwidth. The acoustic coupling members may be mutually spaced apart, for example mutually equispaced apart. The acoustic coupling members may be arranged regularly or irregularly. The acoustic coupling members may be arranged in an array or a grid, for example a periodic array or uniformly spaced array such as a square array, or an aperiodic array or nonuniformly spaced array such as a circular array. The acoustic coupling members may be as described with respect to the first aspect.

In one example, the acoustic coupling members taper in the longitudinal direction. In this way, an acoustic impedance of the acoustic coupling layer may change, for example progressively change and/or decrease, in the longitudinal direction. The acoustic coupling members may be as described with respect to the first aspect. In one example, the acoustic coupling members taper linearly, for example a rate of taper is constant, thereby providing a non-linear change in acoustic impedance as a function of distance in the longitudinal direction. For example, the acoustic coupling members may have straight sides, such as pyramidal or conical or frustoconical acoustic coupling members, in which a width or diameter of the acoustic coupling members varies linearly in the longitudinal direction. In one example, the acoustic coupling members taper non-linearly, for example a rate of taper may increase or decrease in the longitudinal direction. For example, the acoustic coupling members may have curved sides. In one example, the acoustic coupling members taper continuously, for example smoothly. In one example, the acoustic coupling members taper discontinuously, for example the acoustic coupling members may comprise one or more steps. The tapered change in cross-section of the protrusion, and thus acoustic impedance, can suppress the periodic variation in acoustic reflections. Such suppression may not be offered by the protrusions having constant cross-sectional area. In one example, the acoustic coupling members comprise tapered acoustic coupling members, each tapered acoustic coupling member extending from the cavity and having a base with a first cross section shape, and extending along the axis of the extension from the base to a second cross-section shape, and continuously tapering between the base and the second section shape. The tapered change in cross-section of the acoustic coupling members, and thus acoustic impedance, may suppress the periodic variation in acoustic reflections. Such suppression may not be provided by the acoustic coupling members having constant cross-sectional area. Provided the acoustic coupling members are sub-wavelength in separation, in the acoustic far field the corrugations effect will not be apparent. In one example, the acoustic coupling members are substantially mutually adjacent. In one example, the acoustic coupling members are arranged to tessellate. A perforation and/or a plurality of perforations, for example small open access holes, may be provided through a base of the tessellated acoustic coupling members to facilitate encapsulation (also known as potting) of the acoustic coupling members with, for example, an elastomeric material such as butyl rubber, by providing an exit route for otherwise trapped air during manufacture. In one example, an acoustic coupling member of the plurality of acoustic coupling members tapers to a point. In one example, each of the plurality of acoustic members tapers to a point. The applicant has determined that such protrusions may reduce transmission loss, particularly where bases of the acoustic coupling members are either square or equilateral triangles and arranged to tessellate.

For a phased array, as described above, tapered acoustic coupling members are preferred. In the optical domain, work by S. A. Boden & D. M. Bagnall (2006) 4th World Conference on Photovoltaic Energy Conversion, Hawaii, 1358-1361, has established that profiled meta-material surfaces are able to support an impressive anti-reflection effect simultaneously over wide wavelength range 300 nm to 1240 nm, and a wide angular field of view of ~+/−80°. This performance would not be achieved with a completely homogeneous single layer optical AR structure.

In one example, the acoustic coupling layer comprises an encapsulant, preferably an elastomeric material. For examples, pores and/or voids and/or spacings in the acoustic meta-material may be at least partly filled, preferably completely filled, with the encapsulant. For example, where the acoustic meta-material comprises a porous material, open pores in the porous material may be completely filled with the encapsulant. For example, where the acoustic meta-material comprises a plurality of acoustic coupling members such as rods, spacings between the acoustic coupling members may be completely filled with the encapsulant. A thickness of the acoustic coupling layer may be greater than a length of the acoustic coupling members, such that the acoustic coupling members may be fully encapsulated, including one or both ends thereof. In one example, the encapsulant comprises a material selected to have a comparable acoustic impedance to the transmission medium and hence typically a low acoustic impedance, for example an elastomeric material such as butyl rubber. In this way, acoustic coupling between acoustic meta-material and the transmission medium may be maintained, while the acoustic meta-material structure's resistance to corrosion and/or resistance to mechanical impact or shock loading, in use may be improved. In one example, the acoustic coupling layer comprises an acoustic meta-material comprising a plurality of tapered acoustic coupling members provided in an encapsulant comprising an elastomeric material such as butyl rubber. In other words, the acoustic coupling layer comprises a mat of the elastomeric material including the acoustic coupling members embedded therein. In one example, the acoustic coupling layer consists of an acoustic meta-material consisting of a plurality of tapered acoustic coupling members provided in an encapsulant consisting of an elastomeric material such as butyl rubber.

A height of the acoustic coupling layer, from a sound emitting surface of the first electroacoustic transducer and/or the second electroacoustic transducer to the distal surface of the acoustic coupling layer, may be increased compared with the first aspect. The height and/or increase will be less than 60 mm for a rod structure, as described above, and less than 55 mm for a square pyramid shaped structure, as described above, for first electroacoustic transducer and/or the second electroacoustic transducer designed to operate at centre frequencies of 27 kHz.

Hence, a maximum additional height (for example, compared with the first electroacoustic transducer and/or the second electroacoustic transducer) of the acoustic coupling layer may be ~60 mm for a transducers operating at 27 kHz.

A mass of the acoustic coupling layer comprising an acoustic meta-material may depend, at least in part, on a piston diameter of the first electroacoustic transducer and/or the second electroacoustic transducer. For an acoustic meta-material comprising steel rods embedded in a butyl rubber matrix, for example, an overall mass will be ~250 grams to cover an area above a ~50 mm diameter Tonpilz electroacoustic transducer piston. A mass of the shroud (i.e. housing) of the first aspect is ~575 grams giving a total of 825 grams.

For a close packed transducer phased array, such as a hexagonal closed packed or face centred cubic array, a preferred arrangement includes a continuous and/or contiguous acoustic meta-material layer over the entire surface area of the array, and no shroud. The mass of this layer would be <1.2 kg per 100 cm$^2$ area of the phased array.

In one example, the electroacoustic transducer array comprises an array housing arranged to house the first electroacoustic transducer and the second electroacoustic transducer. The array housing may be provided as a plate or a frame, for example, having perforations therein and/or therethrough to receive the first electroacoustic transducer and the second electroacoustic transducer therein. Sound emitting surfaces of the first electroacoustic transducer and/or the second electroacoustic transducer may be recessed relative to a surface, for example a front surface, of the array housing. By recessing the first electroacoustic transducer and/or the second electroacoustic transducer in this way, the first cavity and/or the second cavity respectively may be provided by the recesses thus defined. The array housing may comprise the first passageway, the second passageway and/or the interconnecting passageway and/or parts thereof, as described above. Additionally and/or alternatively, the acoustic coupling layer may comprise the first passageway, the second passageway and/or the interconnecting passageway and/or parts thereof.

As described with respect to the first aspect, the acoustic coupling layer may be surrounded by a housing, for example a shroud, to provide directionality to the output, thereby improving power efficiency. For example, if the acoustic coupling layer comprises an acoustic meta-material, the acoustic meta-material may be supported by a thin lattice or lattices that is/are connected to the shroud. However other configurations for mounting the meta-material structure have been identified. For the specific application of torpedo homing heads that require a closely packed transducer phased array to enable off axis target search, the acoustic meta-material would be best fitted over the entire front surface of the transducer array. This will enable the sonar beam in search mode to be steered over angular range without any interference from a shroud structure. The required water cavity between the piston head of the Tonpilz transducer would be provided by slightly recessing the existing transducers into the acoustic apertures on the front plate of the sonar array.

In one example, the acoustic coupling layer is arranged to extend across at least a part of a surface of the array housing, for example thereby extending across the first electroacoustic transducer and the second electroacoustic transducer therein. In one example, the acoustic coupling layer is arranged to extend fully across the first electroacoustic transducer and the second electroacoustic transducer in the array housing. In one example, the acoustic coupling layer comprises a continuous acoustic coupling layer arranged to extend across at least a part of a surface of the array housing. In one example, the acoustic coupling layer comprises a plurality of portions and the portions are arranged to provide a contiguous acoustic coupling layer arranged to extend across at least a part of a surface of the array housing. In one example, the acoustic coupling layer is arranged to confront the at least the part of the surface of the array housing.

In one example, the acoustic coupling layer is arranged to contact at least the part of the surface of the array housing. For example, the acoustic coupling layer may directly overlay the surface of the array housing, in contact therewith.

In one example, the acoustic coupling layer is coupled, for example mechanically and/or adhesively coupled, to the array housing. In one example, the acoustic coupling layer is releasably coupled to the array housing. In this way, the acoustic coupling layer may be removed for maintenance of the first electroacoustic transducer and/or the second electroacoustic transducer thereunder.

In one example, the first electroacoustic transducer and/or the second electroacoustic transducer is a Tonpilz transducer. The Tonpilz transducer may be as described previously with respect to the first aspect.

In one example, the first electroacoustic transducer and the second electroacoustic transducer are arranged regularly or irregularly. The first electroacoustic transducer and the second electroacoustic transducer may be arranged in an array or a grid, for example a periodic array or uniformly spaced array such as a square array, a triangular array, a hexagonal array, or an aperiodic array or non-uniformly spaced array such as a circular array. In one example, the first electroacoustic transducer and the second electroacoustic transducer are arranged in a close packed array, for example a hexagonal close packed array or a face centred cubic close packed array. The first electroacoustic transducer and the second electroacoustic transducer may be spaced according to required steering of the electroacoustic array. If the phased array needs to steer through ~+/−45° about the boresight for example, then the separation between the centres of the first electroacoustic transducer and the second electroacoustic transducer would need to be about 1.41 acoustic wavelengths for the specific case of a square array at its centre frequency of operation.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIGS. 12A and 12B schematically depict an electroacoustic transducer array according to an exemplary embodiment.

DETAILED DESCRIPTION OF THE DRAWINGS

Figure 1:
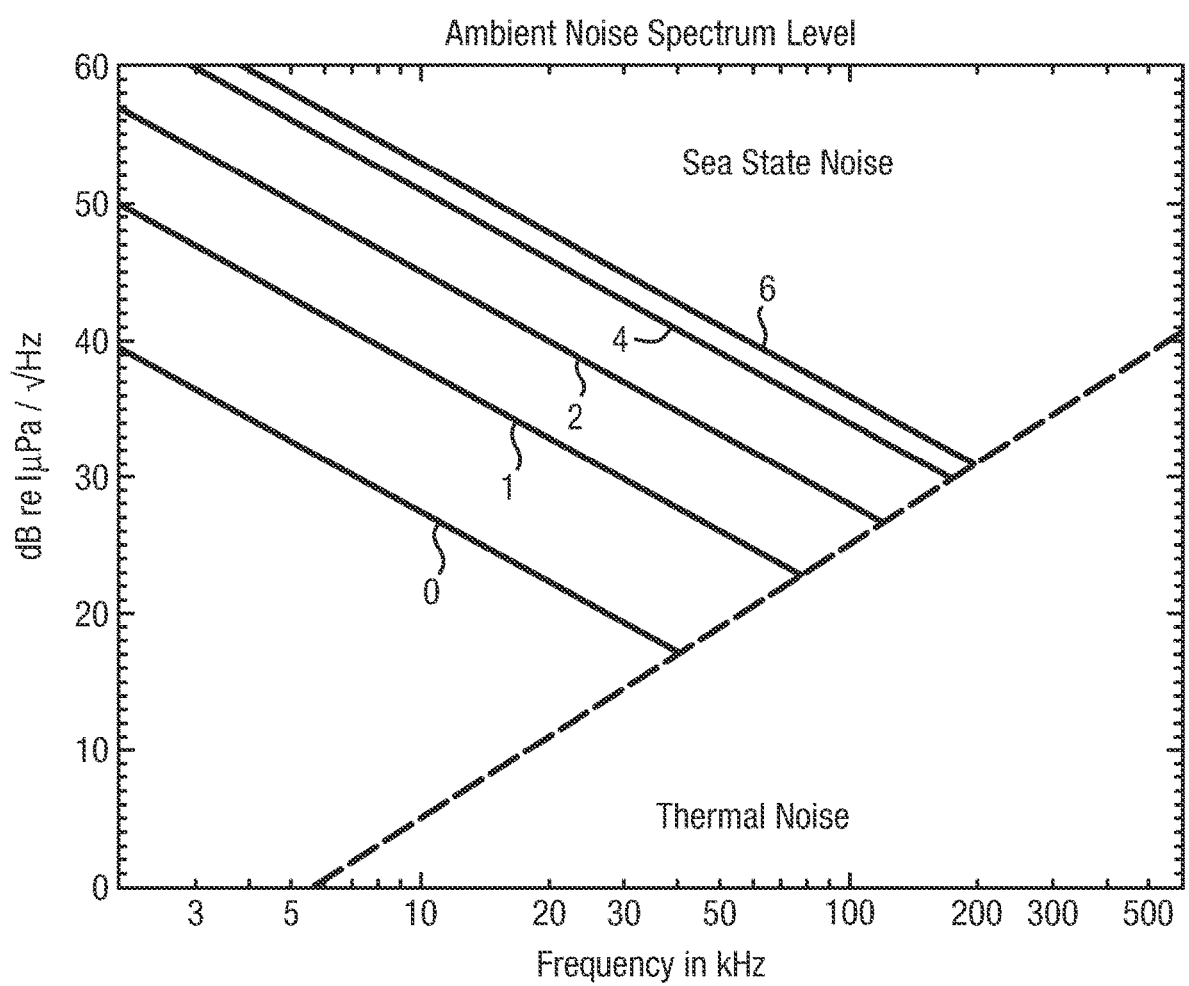
FIG. 1 depicts a graph of predicted ambient noise spectrum level with sea state and thermal noise versus frequency.
Figure 2A:
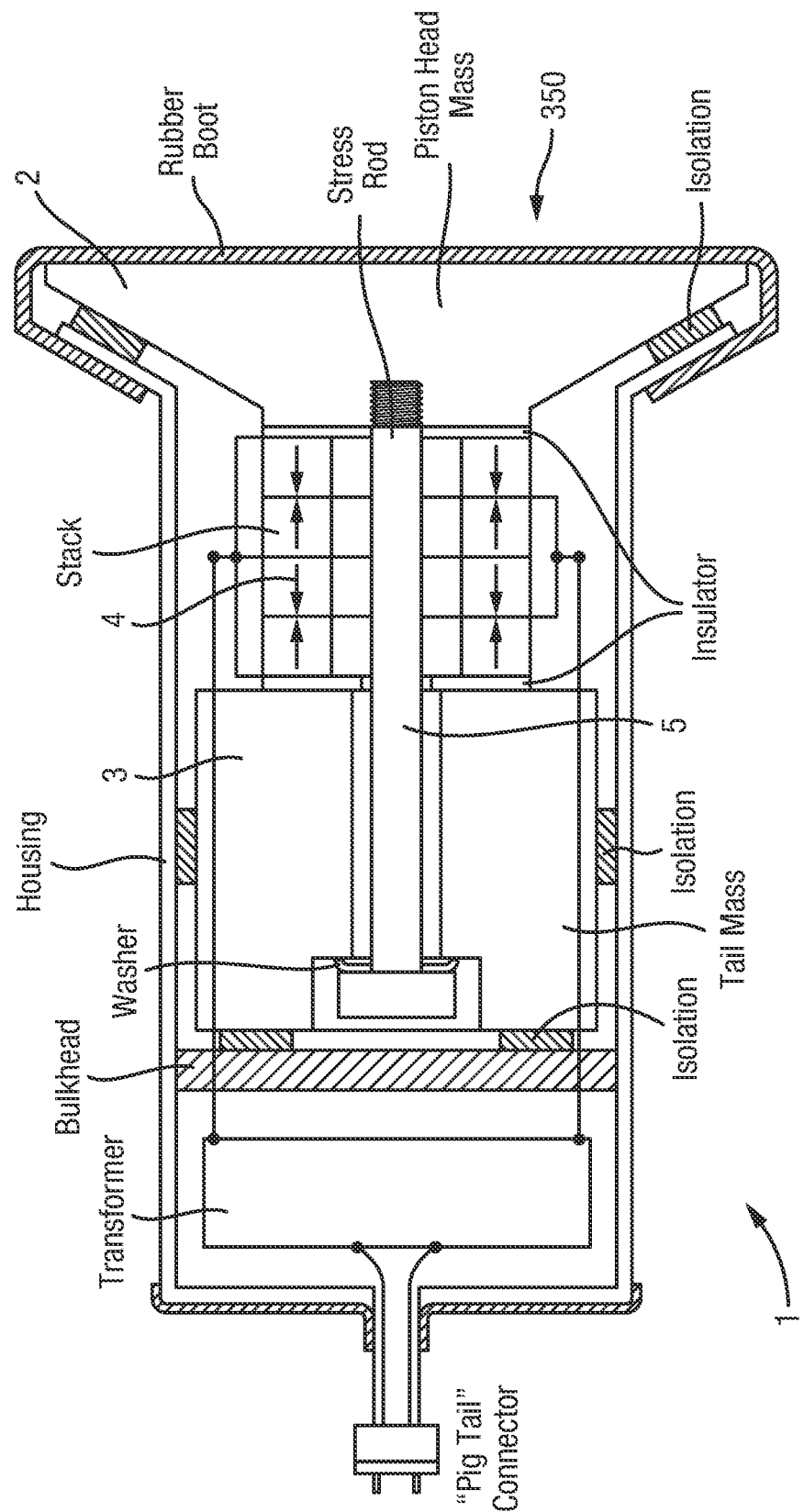
FIG. 2A schematically depicts a conventional Tonpilz transducer.
Figure 2B:
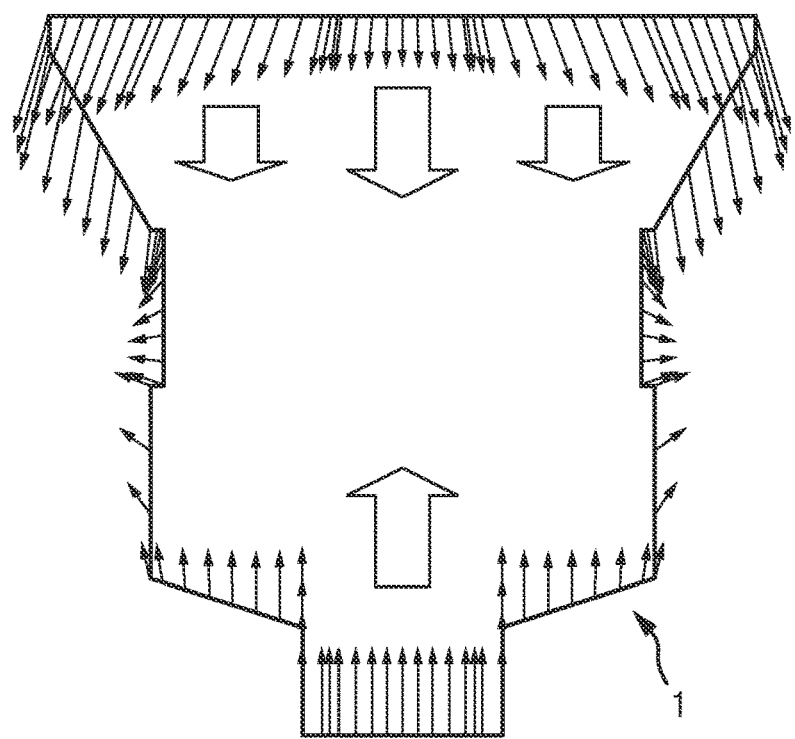
FIGS. 2B and 2C schematically depict characteristic vibration modes of the Tonpilz transducer of FIG. 2A consisting of a longitudinal mode (2B) and a flapping mode (2C)
Figure 2C:
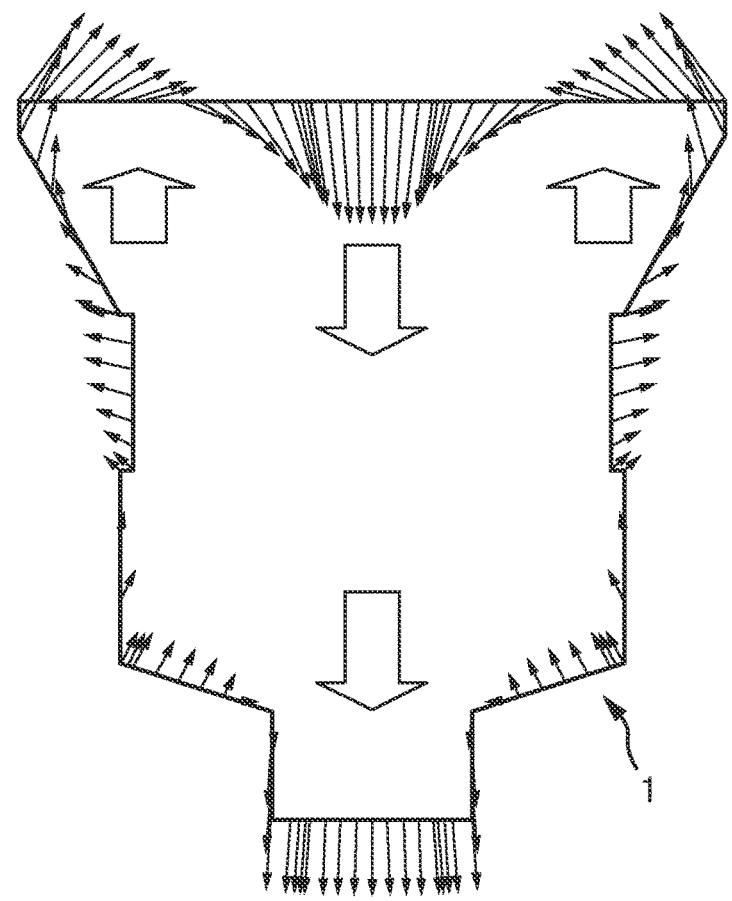
Figure 3A:
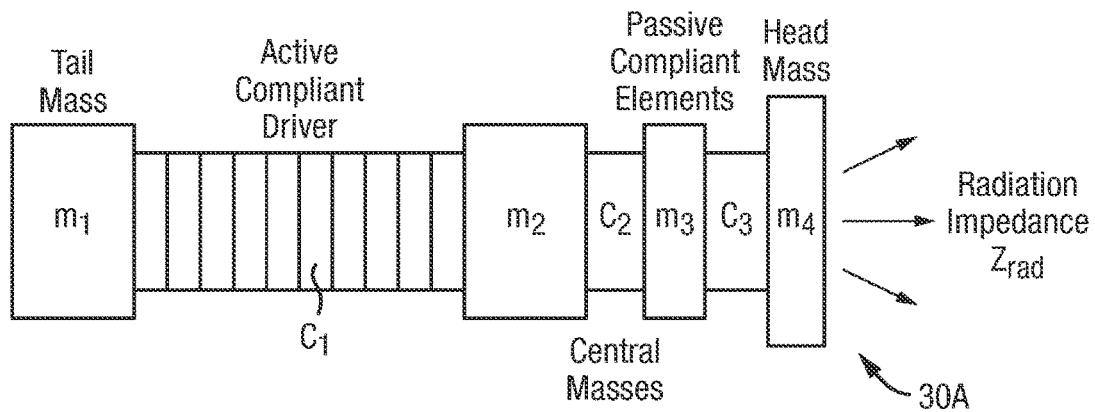
FIGS. 3A and 3B schematically depict a published triple resonant structure Tonpilz transducers as a configuration to provide a route to wider frequency bandwidths.
Figure 3B:
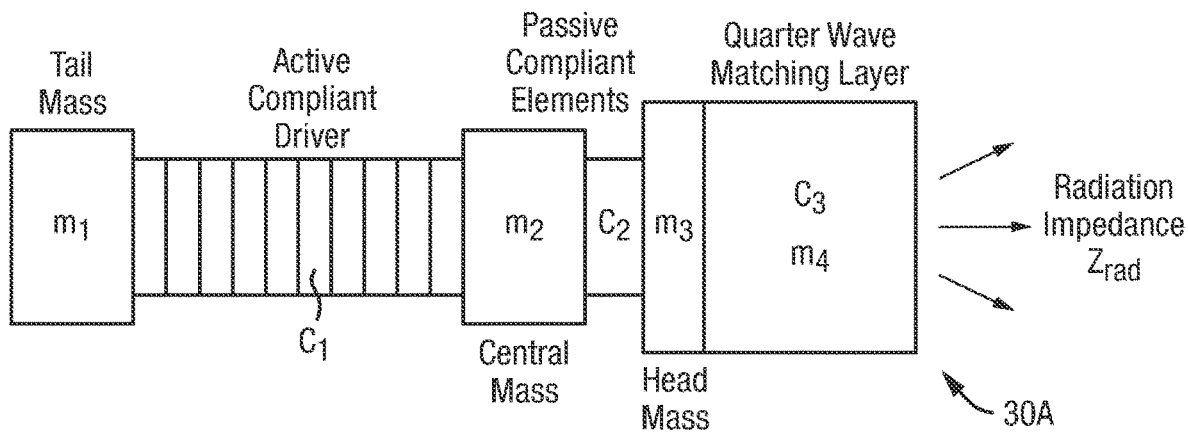
Figure 4:
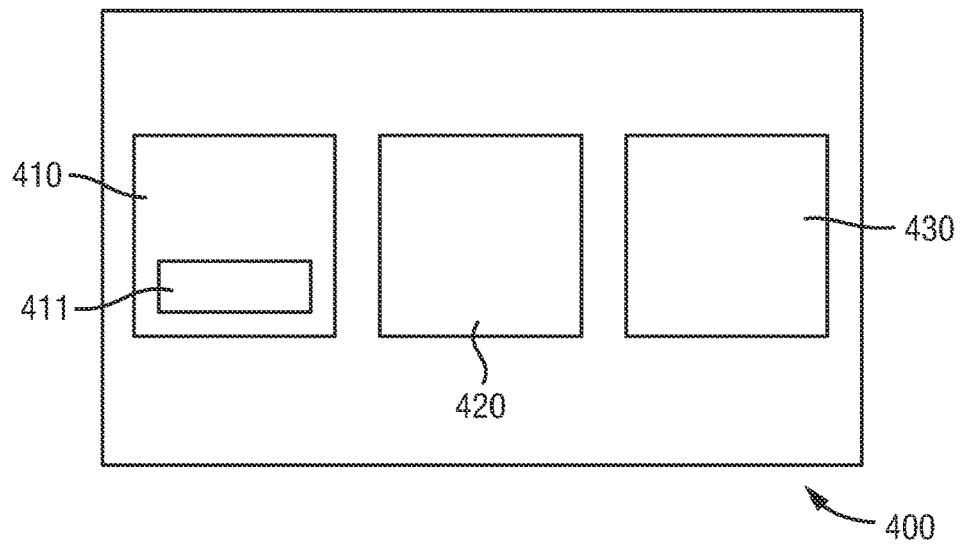
FIG. 4 schematically depicts a transducer according to an exemplary embodiment.

FIG. 4 schematically depicts a transducer 400 according to an exemplary embodiment.

In detail, the electroacoustic transducer 400 comprises an active element 410. The electroacoustic transducer 400 comprises an acoustic coupling layer 430 arranged to acoustically couple, in use, the active element to a transmission medium. The electroacoustic transducer 400 further comprises a cavity 420 arranged between the active element 410 and the acoustic coupling layer 430 to receive a fluid. In this way, acoustic coupling of the electroacoustic transducer and the transmission medium is improved, as described above.

In this example, the active element 410 comprises a piezoelectric material 411. The active element may comprise additionally and/or alternatively other materials as described previously.

Figure 5A:
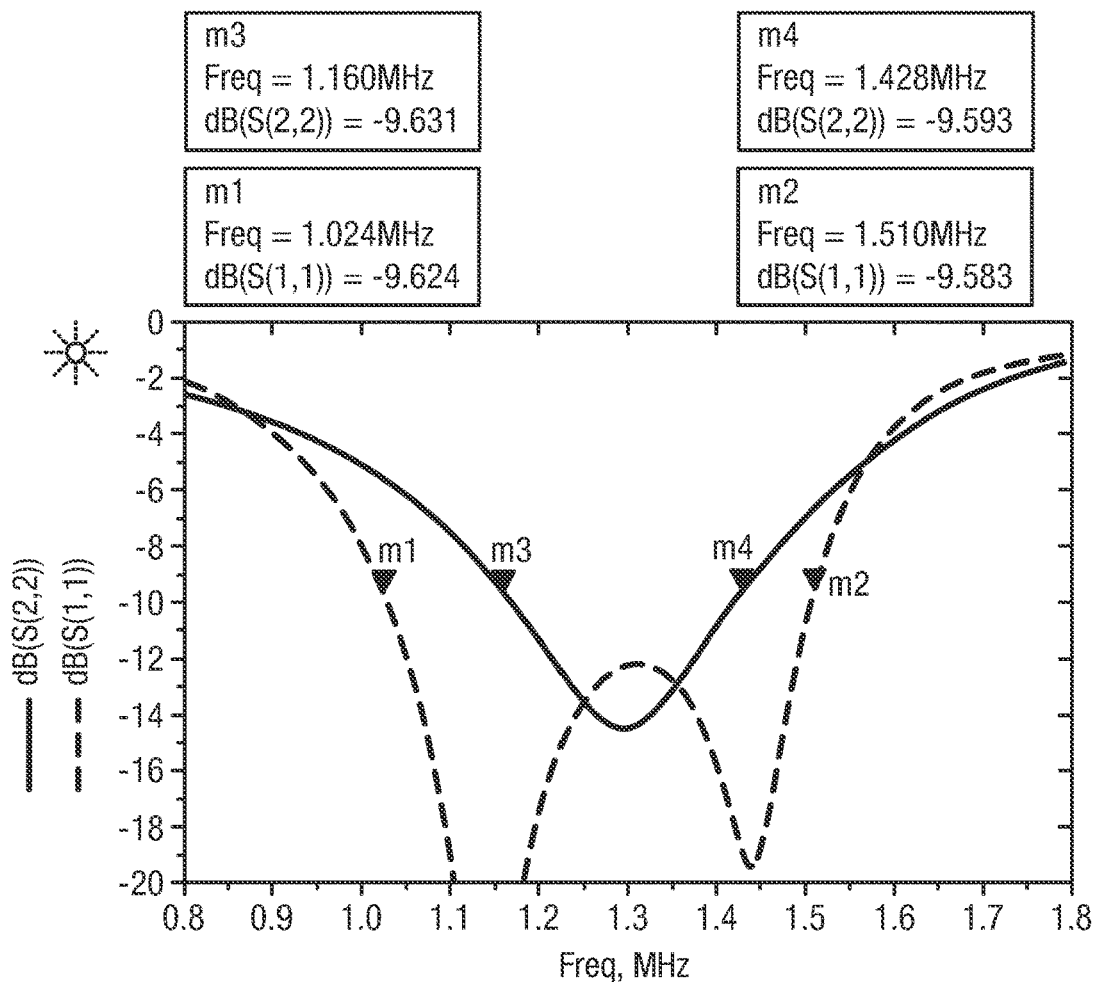
FIGS. 5A and 5B depict calculated electrical insertion loss frequency responses for an electrically tuned Pz27 grade PZT transducer with and without a controlled thickness of an acoustically thin and acoustically impedance mismatched layer between the transducer and the substrate into which sound is being broadcast.
Figure 5B:
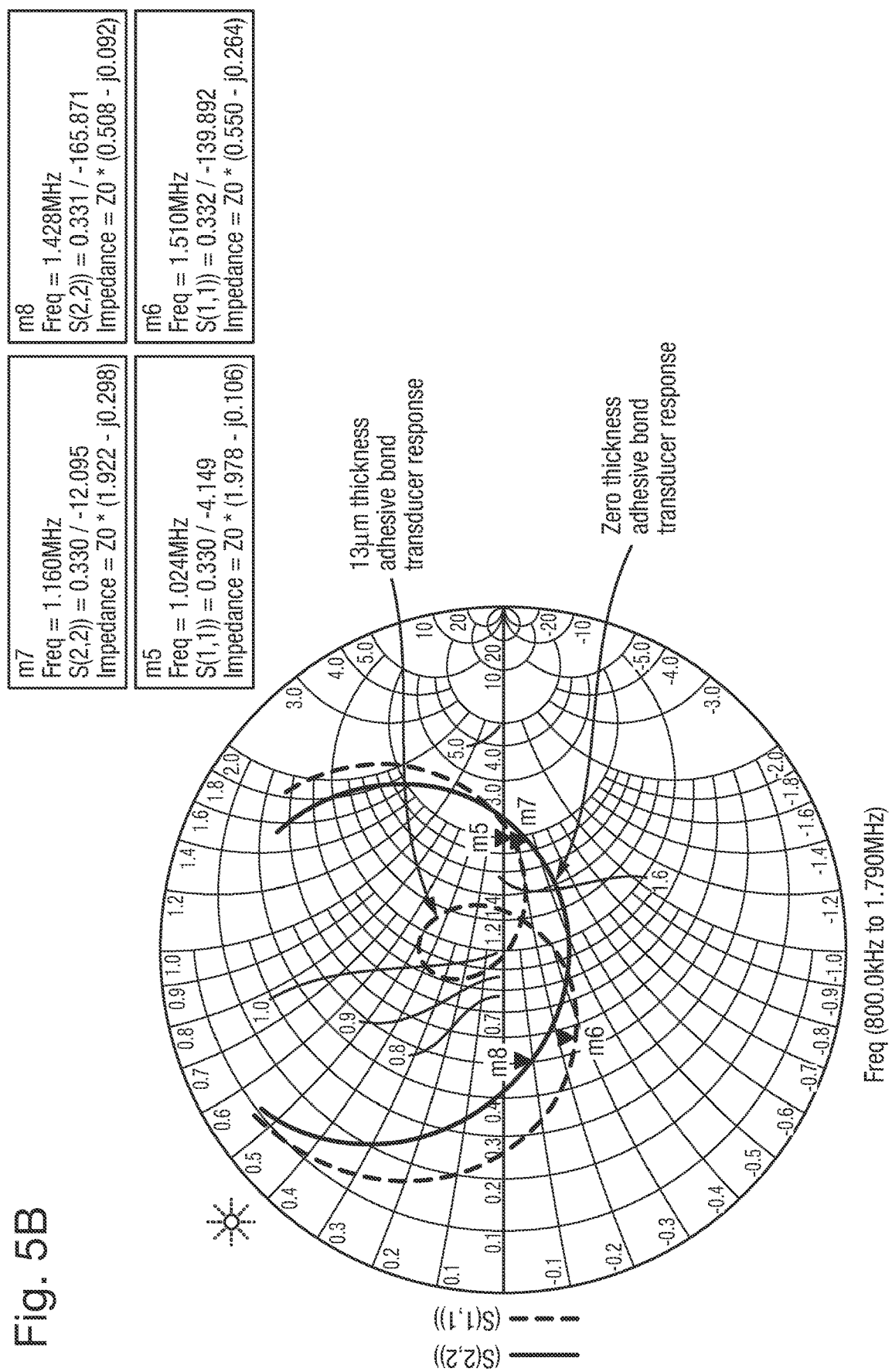

FIGS. 5A and 5B depict calculated frequency responses for an electrically tuned Pz27 grade PZT transducer with and without a low acoustic impedance filled layer of controlled thickness between the piezoelectric platelet and the steel substrate into which sound is being broadcast;

In detail, FIG. 5A shows the electrical Insertion Loss responses of a transducer both with an impedance mismatch layer and without an impedance mismatch layer. FIG. 5B shows the Smith Chart plots, corresponding to the Insertion loss plots of FIG. 5A. In this example, the impedance mismatch is provided by a 13 µm adhesive layer comprising a 2 part epoxy resin adhesive layer (MasterBond EP46HT-2), to demonstrate a principle of the impedance mismatch layer, as provided by the cavity comprising the fluid according to the invention.

Particularly, in this transducer, a platelet of PZT is bonded to a steel barrier with an epoxy resin. The acoustic impedance of the epoxy is far smaller than the acoustic impedances of both the steel barrier and PZT ceramic transducer.

The surprising result with this high frequency transducer design is that although the acoustic impedance of the epoxy bond is completely mismatched from the two substrates that it bonds together, the optimal structural design with the widest fractional bandwidth is not obtained by making the adhesive bond-line as thin as possible; although the bond line needs to be thin, the optimal bond line thickness should generally be non-zero in thickness. Modelling of the transducers electrical response shows that reducing the thickness of the adhesive layer from 13 µm to zero reduced the 2:1 VSWR bandwidth of the transducer by approximately ~50%. The plots show modelled electrical insertion loss responses for the same transducer, using individually optimised electrical matching circuits for each case, with and without a low acoustic impedance adhesive bond layer between the transducer and the steel barrier.

The reflectivity of the epoxy interface between the piezoelectric substrate and the steel substrate to which it is bonded is found to rapidly increase with the bond thickness until subsequent constructive interference effects in the bond layer generate a series of periodic narrow transmission windows with increasing bond thickness. In transducer design the epoxy interface cannot be ignored unless it extremely thin, that is for example between $\ll\lambda/10$ to $<\lambda/100$ at the operational centre frequency. The calculated reflectivity of the 13 µm thick adhesive layer is 30.3%. This is much larger than the reflectivity arising from the acoustic impedance mismatch of the piezoelectric layer and the 17-4 stainless steel substrate of only 2.2%.

The greatest improvement to the fractional bandwidth of the transducer from a controlled thickness bond layer is found to be achieved when the acoustic impedance of piezoelectric layer is smaller than that of the substrate into which the piezoelectric is coupled.

The cavity comprising the fluid according to the invention is expected to behave similarly to the adhesive layer.

Figure 6A:
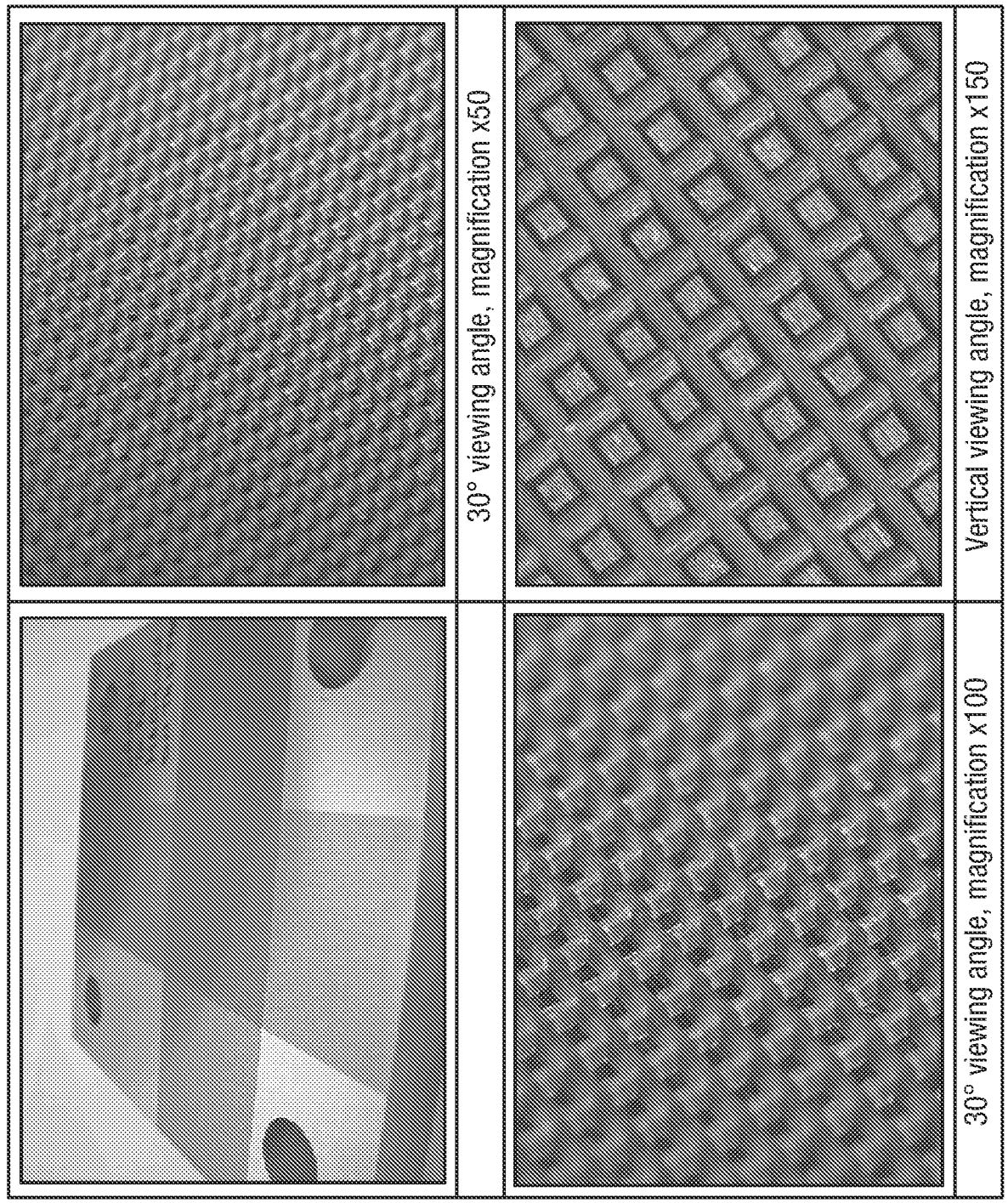
FIGS. 6A and 6B depict photographs of an acoustic meta-material according to an exemplary embodiment and measured reflection coefficients for a transducer comprising the acoustic meta-material, respectively.
Figure 6B:
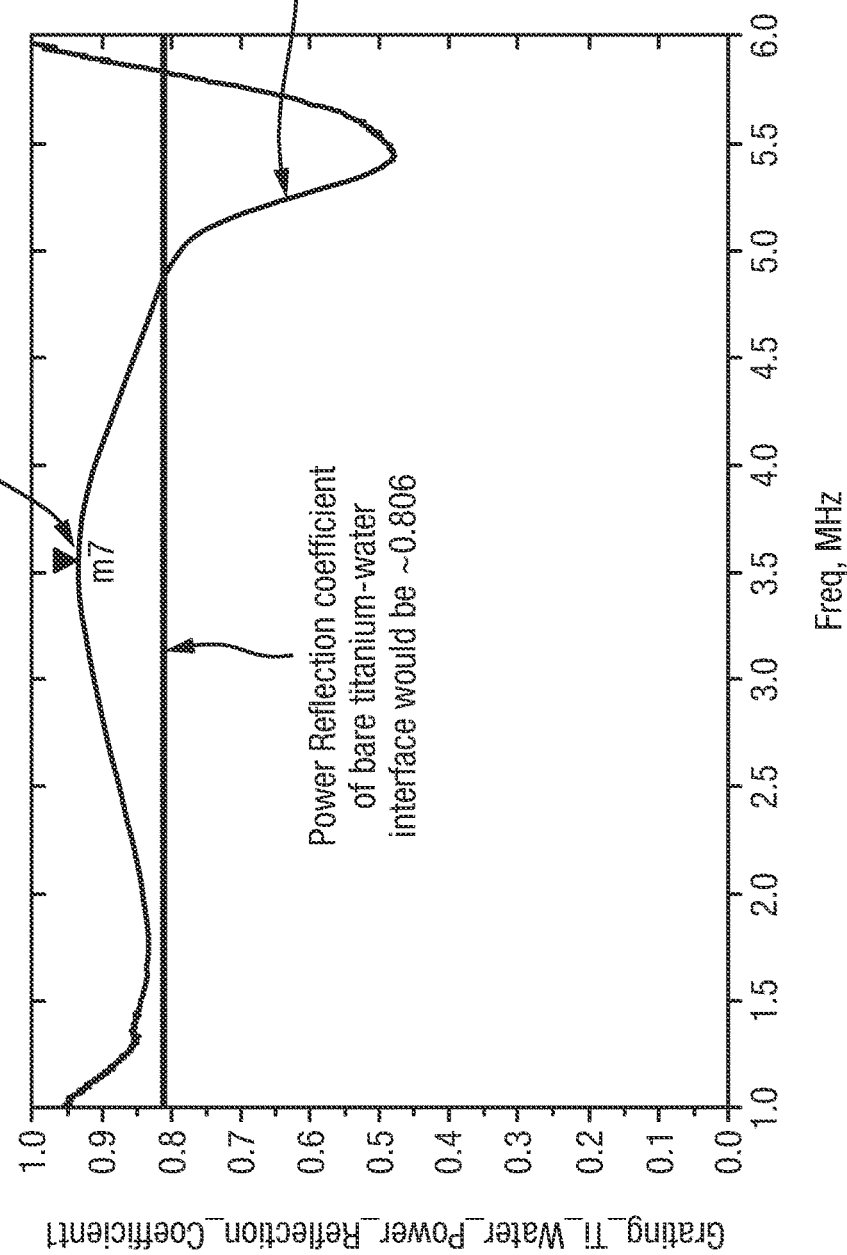

FIGS. 6A and 6B depict photographs of an acoustic meta-material according to an exemplary embodiment and measured reflection coefficients for a transducer comprising the acoustic meta-material, respectively.

In detail, FIG. 6A depicts photographs of a binary grating structure comprising a rectangular array of approximately square pillars that were sawn into the surface of the titanium substrate using a wafer saw. This binary grating was designed for a 36° Y cut lithium niobate transducer with a centre frequency of 3.3 MHz and a 2:1 VSWR frequency bandwidth of 1.51 MHz, a fractional bandwidth Δf/fc of 45.5%.

In detail, FIG. 6B depicts results of acoustic reflectivity of a flat interface between titanium and de-ionised water from simple acoustic impedance mismatch theory would be ~80.6%. The results show that the reflectivity of the grating surface over the frequency range ~1 to ~6 MHz varies from a peak reflectivity of 93.4% at 3.557 MHz to less than 50% reflectivity at 5.45 MHz, where the anti-reflection performance of the grating is then compromised by appearance of 1st order diffraction lobes in the water medium from the square pillars of the array whose square pitch was 280 µm.

Hence, for example, relatively simple acoustic meta-structures consisting of a square symmetric array of sub-wavelength (in water) square pillars may markedly change the acoustic reflectivity of a titanium-water interface over a wide frequency band centred on 3.56 MHz.

Hence, for example, relatively complex tapered metal profile acoustic meta-structures that progressively match the impedance of the metal to the fluid may provide further improved performance. These relatively complex acoustic meta-structures will be more practical to fabricate for transducers designed to operate at centre frequencies of 25 kHz to 35 kHz, than at a relatively higher centre frequency of ~3.6 MHz.

Figure 7:
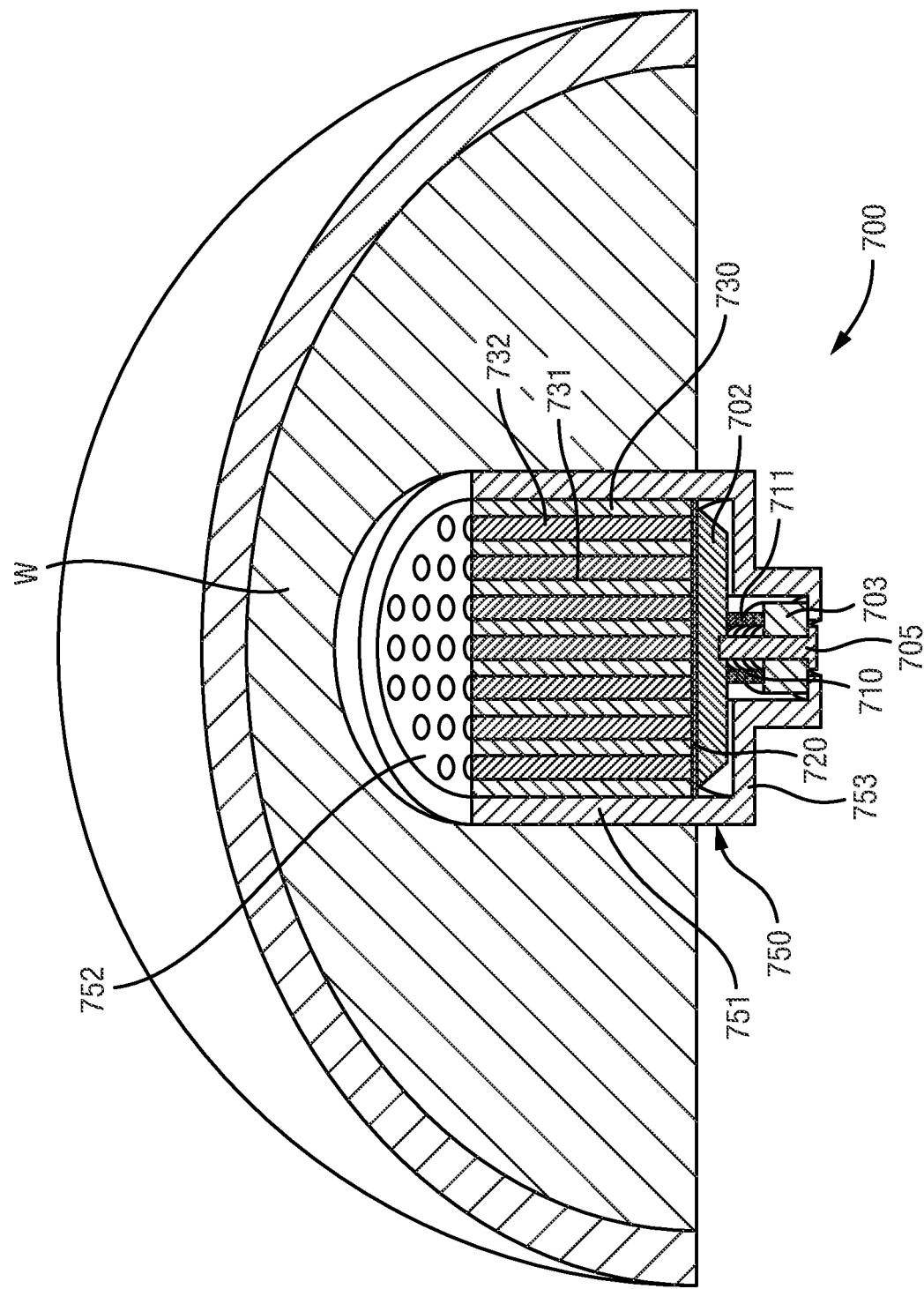
FIG. 7 schematically depicts a transducer according to an exemplary embodiment.

FIG. 7 schematically depicts a transducer 700 according to an exemplary embodiment.

In detail, the electroacoustic transducer 700 comprises an active element 710. The electroacoustic transducer 700 comprises an acoustic coupling layer 730 arranged to acoustically couple, in use, the active element to a transmission medium W. The electroacoustic transducer 700 further comprises a cavity 720 arranged between the active element 710 and the acoustic coupling layer 730 to receive a fluid. In this way, acoustic coupling of the electroacoustic transducer and the transmission medium is improved, as described above.

In detail, the electroacoustic transducer 700 is a Tonpilz transducer comprising a piston head mass 702, a tail mass 703, a piezoelectric stack 711 and a stress rod 705. In this example, the active element 710 comprises the piezoelectric stack 711. The piezoelectric material 711 is in the form of a stack of four annular rings that for piezoelectric materials are optimally poled in adjacent rings in opposite directions. In this way, an issue of a ground electrode being directly next to a high voltage live electrode, and separated from one another by only a thin adhesive layer typically, is avoided. The transmission medium W is water.

The cavity 720 has a thickness of 1 mm in this example and is completely filled with the transmission medium W. The cavity 720 is in fluid communication with the transmission medium W, such that the transmission medium provides a fluid reservoir, in use.

The acoustic coupling layer 730 comprises an acoustic meta-material 731 comprising 37 (i.e. a plurality) acoustic coupling members 732. The acoustic coupling members 732 are in the form of rods or pillars having constantly-shaped circular cross sections. The acoustic coupling members comprise elongate acoustic coupling members, having lengths of 50 mm and diameters of 4 mm and hence aspect ratios of 12.5. A length of an acoustic coupling member of the plurality of acoustic coupling members 732 corresponds to $\Lambda/2$ where $\Lambda$ is the acoustic wavelength within the acoustic coupling layer. The plurality of acoustic coupling members 732 have the same length.

The plurality of acoustic coupling members 732 are arranged mutually aligned in a longitudinal direction. The plurality of acoustic coupling members 732 are substantially mutually adjacent, equispaced apart by a distance 7 mm. The plurality of acoustic coupling members 732 are arranged in a regular square array. Regions between the plurality of acoustic coupling members 732 provide open pores. The open pores in this example are in fluid communication with the transmission medium W, in use, but in other examples the pores would be filled with for example butyl rubber to isolate the acoustic coupling members from seawater corrosion. The open pores are also in fluid communication with the cavity 720. Where the acoustic meta-material is potted with a material such as Butyl rubber, a access channel to the cavity 720 would need to be provided to a fluid reservoir or alternatively to the external fluid medium W.

The transducer 700 comprises a housing 750 having a wall 751 arranged to surround the acoustic coupling layer 730. The housing 750 defines a cylindrical housing having an inner diameter of 52 mm. A wall thickness of the wall 751 is 5 mm. A fill ratio of the housing 750 by the acoustic coupling layer 730 is 78.1%.

The housing 750 has an open end 752, in this example distal the cavity 720 and a closed end 753, proximal the cavity 720. The housing 750 is arranged to support, for example mechanically and/or structurally support, the acoustic coupling layer 730, using a frame (not shown). A transverse thickness of the frame is $\ll 158$. The housing 750 is arranged to support the acoustic coupling layer 730 spaced apart from the active element 710, thereby providing the cavity 720.

The active element comprises a polycrystalline ceramic piezoelectric material. Lead Zirconate Titanate (PZT-4).

Figure 8A:
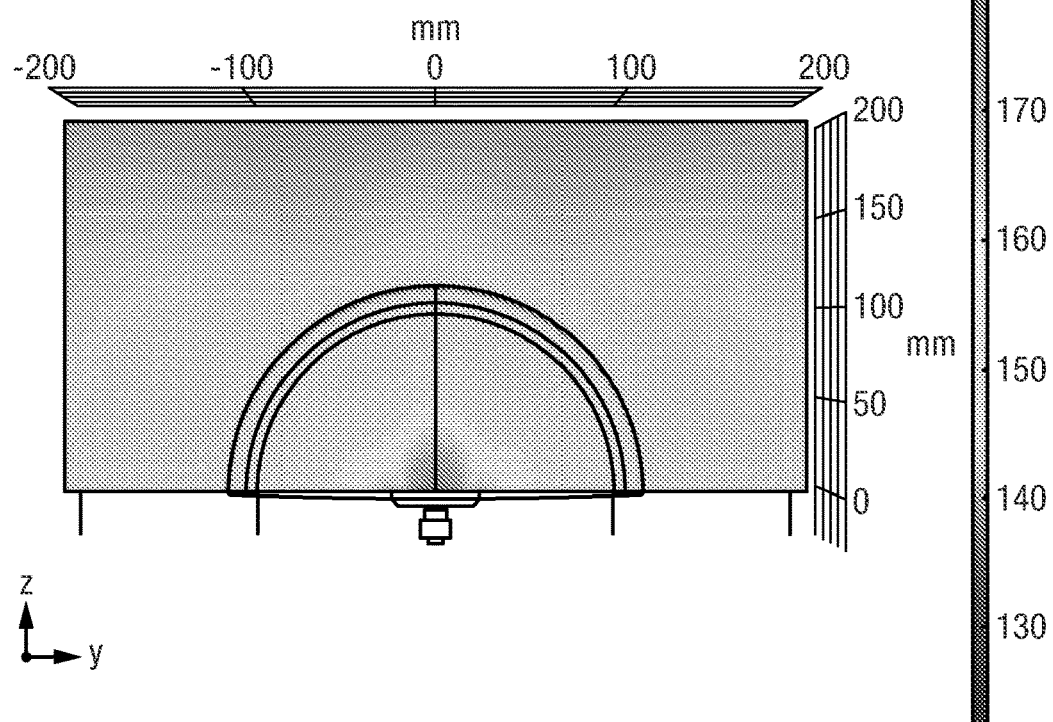
FIGS. 8A to 8C depict calculated sound pressure level plots for a conventional transducer.
Figure 8B:
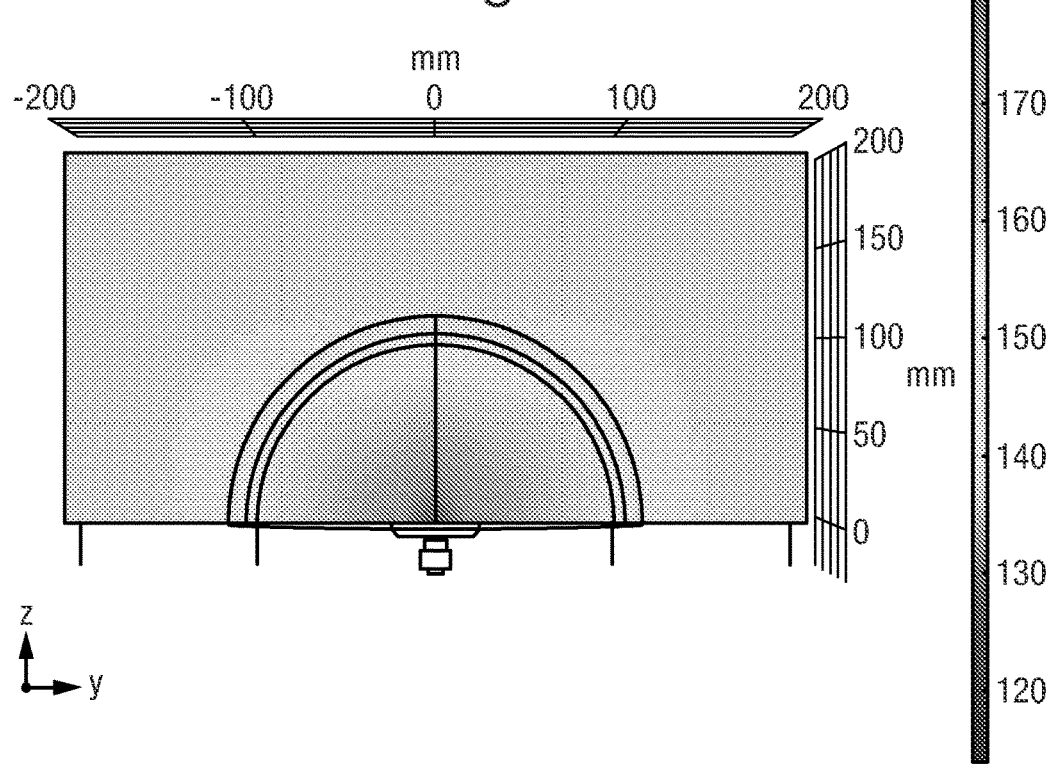
Figure 8C:
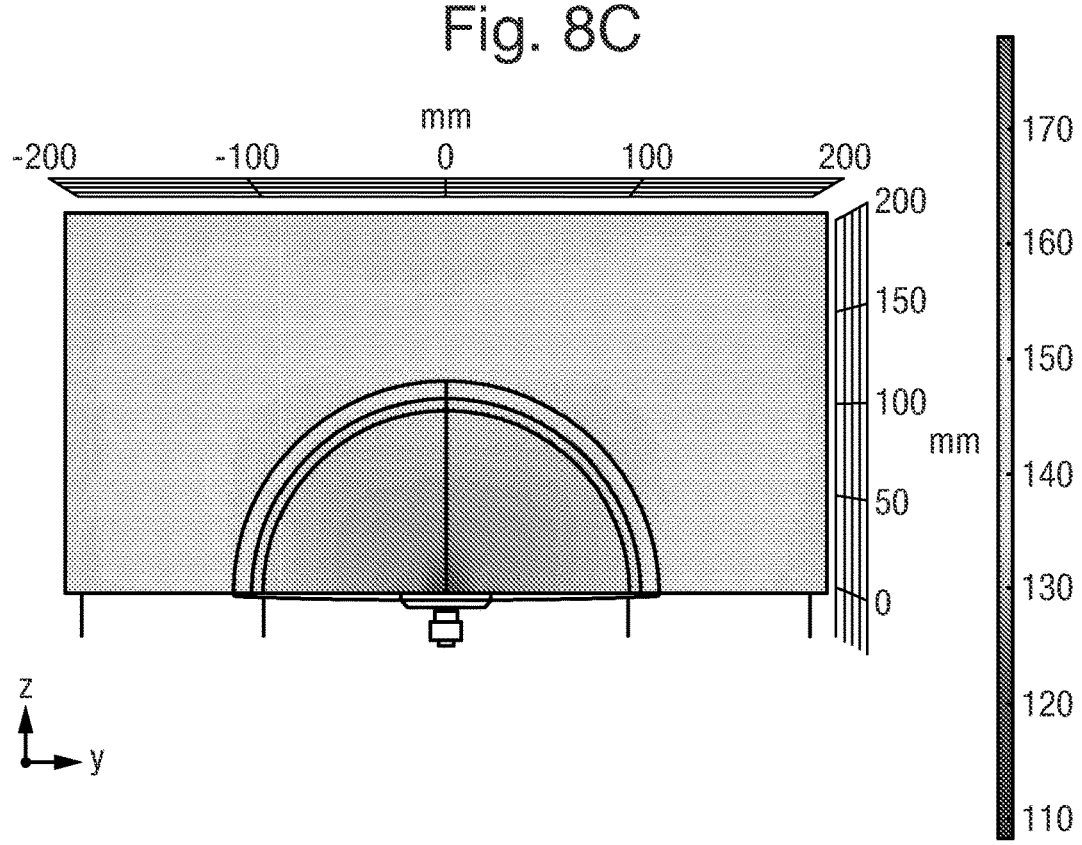

FIGS. 8A to 8C depict calculated sound pressure level plots for a conventional Tonpilz transducer.

Figure 9A:
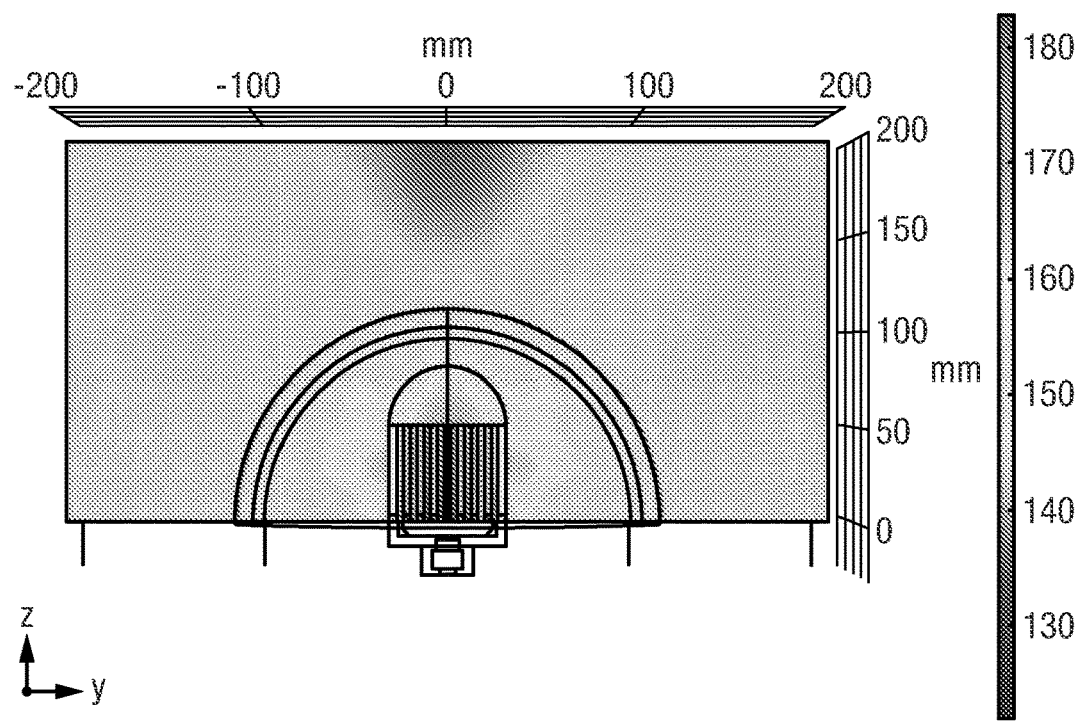
FIGS. 9A to 9C depict calculated total radiated acoustic power plots for the transducer of FIG. 7.
Figure 9B:
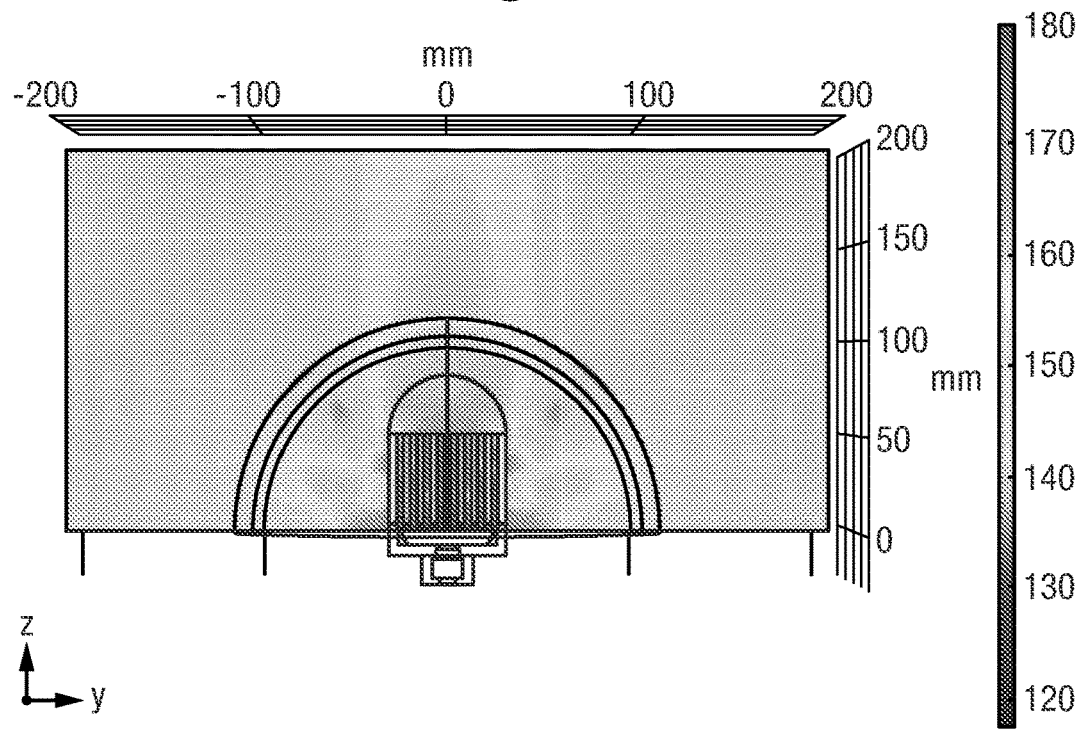
Figure 9C:
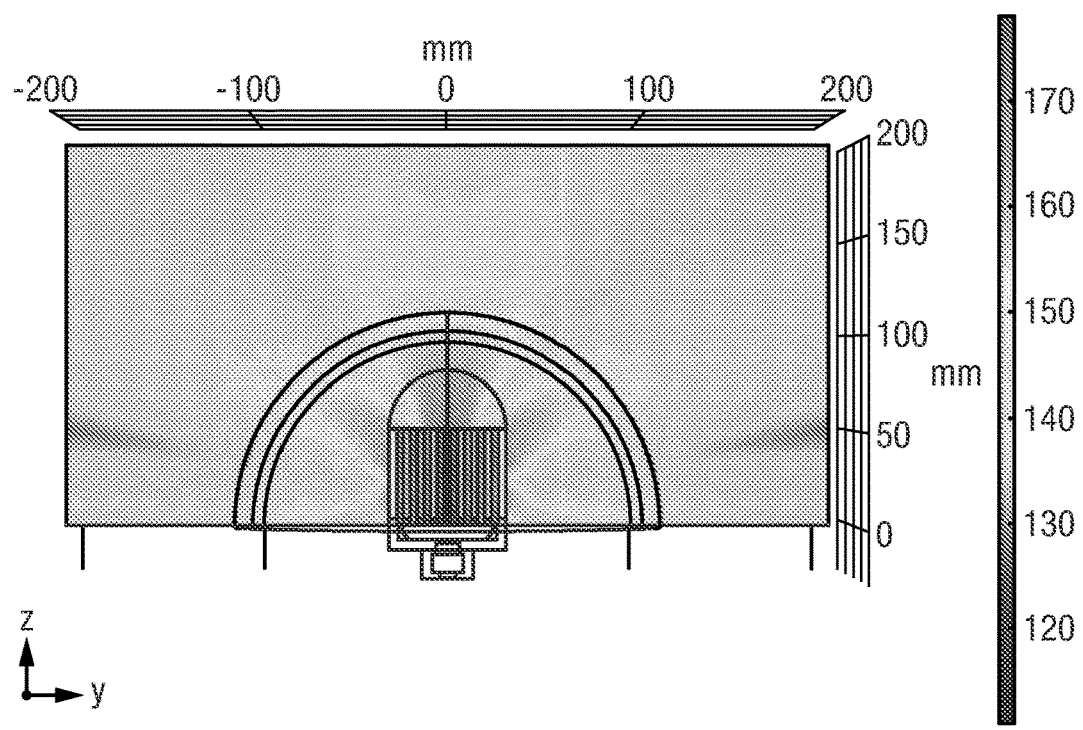

FIGS. 9A to 9C depict calculated total radiated acoustic power plots for the Tonpilz transducer of FIG. 7 as a function of frequency In detail, FIGS. 8A to 8C and FIGS. 9A to 9C depict sound pressure level (dB) plots calculated using COMSOL Multiphysics® Modeling Software (COMSOL, Inc., USA). FIGS. 8A and 9A are calculated at 30 kHz, FIGS. 8B and 9B are calculated at 35 kHz and FIGS. 8C and 9C are calculated at 40 kHz.

At 35 kHz, the central acoustic beam of the meta-material structure (FIG. 9B) is much more collimated than achieved with a standard Tonpilz transducer.

FIG. 9 shows calculated total transmitted sound power plots for the transducer of FIG. 7 as a function of frequency with and without the acoustic meta-material structure and shroud described above.

Figure 10:
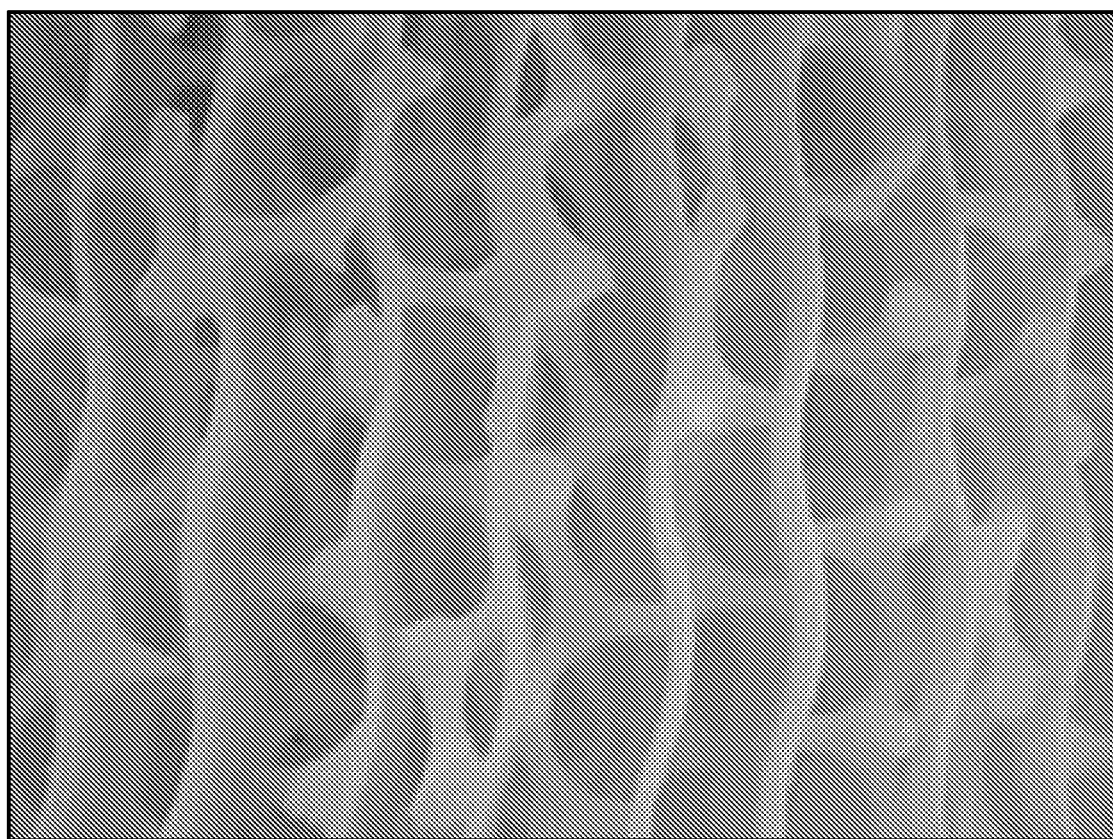
FIG. 10 depicts a photograph of an acoustic meta-material according to an exemplary embodiment.

FIG. 10 depicts a photograph of an acoustic meta-material AMM according to an exemplary embodiment.

In detail, the acoustic meta-material AMM is formed by 3D printing, providing a mechanically stiff acoustic meta-material structure having interconnected open pores, suitable for an acoustic coupling layer according to an exemplary embodiment. The acoustic meta-material AMM may be mounted directly onto a housing. The acoustic meta-material AMM would be formed from a metal that is then filled for example with a butyl rubber to prevent corrosion issues.

Figure 11:
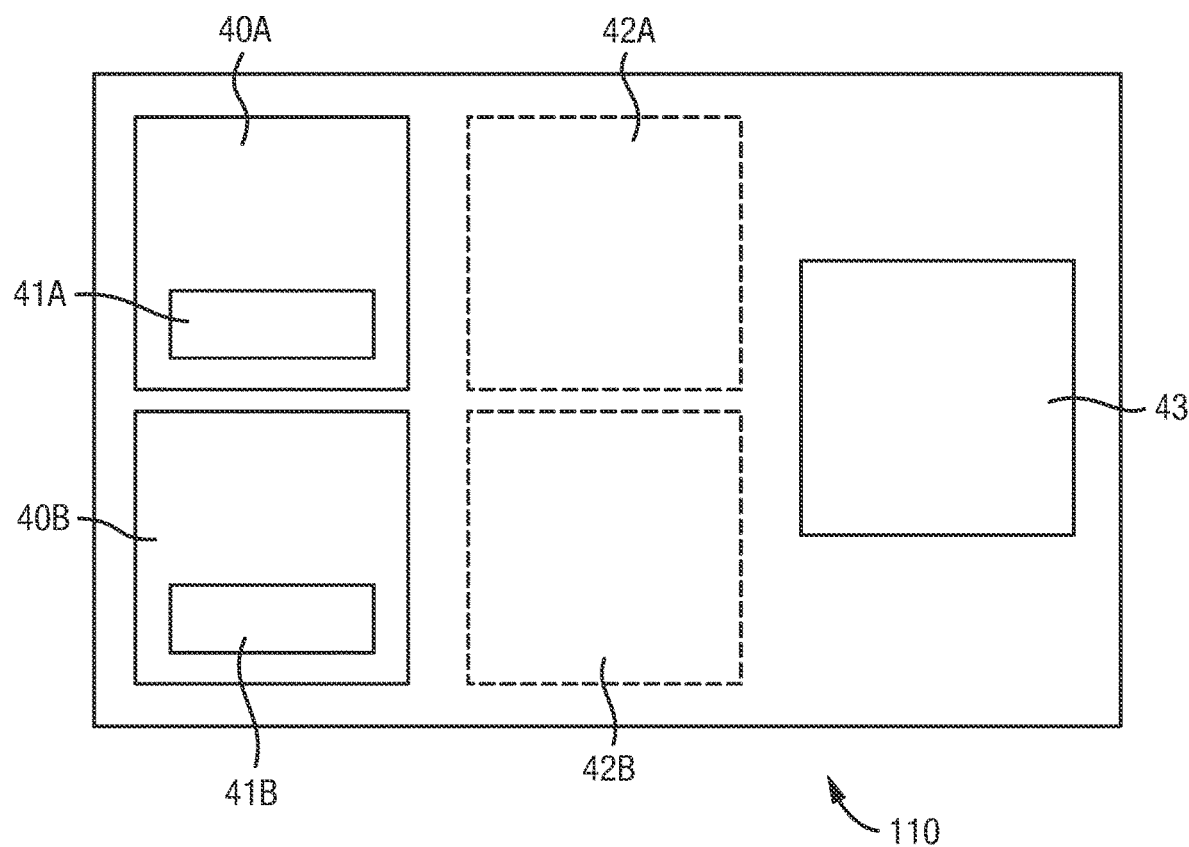
FIG. 11 schematically depicts an electroacoustic transducer array according to an exemplary embodiment.

FIG. 11 schematically depicts an electroacoustic transducer array 110 according to an exemplary embodiment.

Particularly, FIG. 11 schematically depicts the electroacoustic transducer array 110 comprising a first electroacoustic transducer 40A comprising a first active element 41A and a second electroacoustic transducer 40B comprising a second active element 41B. The electroacoustic transducer array 110 comprises an acoustic coupling layer 43 arranged to acoustically couple, in use, the first active element 41A and the second active element 41B to a transmission medium. The electroacoustic transducer array 110 comprises a first cavity 42A arranged between the first active element 41A and the acoustic coupling layer 43 to receive a first fluid; and/or a second cavity 42B arranged between the second active element 41B and the acoustic coupling layer 43 to receive a second fluid. In this way, acoustic coupling of the electroacoustic transducer array 110 and the transmission medium is improved.

The advantages of the electroacoustic array 110 are as described above with respect to the fourth aspect.

FIGS. 12A and 12B schematically depict an electroacoustic transducer array 120 according to an exemplary embodiment. FIG. 12A schematically depicts a plan view of the electroacoustic transducer array 120 and FIG. 12B schematically depicts a cross-sectional view on X-X of FIG. 12A of the electroacoustic transducer array 120. In FIG. 12B, hidden lines are not shown, to improve clarity.

Particularly, FIGS. 12A and 12B schematically depict the electroacoustic transducer array 120 comprising a first electroacoustic transducer 40A comprising a first active element 41A and a second electroacoustic transducer 40B comprising a second active element 41B. The electroacoustic transducer array 120 comprises an acoustic coupling layer 43 arranged to acoustically couple, in use, the first active element 41A and the second active element 41B to a transmission medium. The electroacoustic transducer array 120 comprises a first cavity 42A arranged between the first active element 41A and the acoustic coupling layer 43 to receive a first fluid and a second cavity 42B arranged between the second active element 41B and the acoustic coupling layer 43 to receive a second fluid. In this way, acoustic coupling of the electroacoustic transducer array 120 and the transmission medium is improved.

In more detail, the electroacoustic transducer array 120 comprising seven similar Tonpilz electroacoustic transducers 40A-40G, including the first electroacoustic transducer 40A and the second electroacoustic transducer 40B, comprising active elements 41A-41G, respectively (not all shown, for clarity). The seven electroacoustic transducers 40A-40G are arranged in a close-packed hexagonal array.

In more detail, the acoustic coupling layer 43 comprises an acoustic meta-material comprising a plurality of conical acoustical coupling members 431 and an encapsulant 432, preferably an elastomeric material such as butyl rubber. Spacings between the acoustic coupling members 431 are completely filled with the encapsulant 432. A thickness of the acoustic coupling layer 43 is greater than a length of the acoustic coupling members 431, such that the acoustic coupling members 431 are fully encapsulated, including one or both ends thereof. In other words, the acoustic coupling layer 43 comprises a mat of the elastomeric material 432 including the acoustic coupling members 431 completely embedded therein.

In more detail, the first cavity 42A is arranged between the first active element 41A and the acoustic coupling layer 43 to receive the first fluid and is provided by a sound emitting surface of the first electroacoustic transducer 40A being spaced apart from the acoustic coupling layer 43. The second cavity 42B is similarly provided. Respective cavities 42A-42G are similarly provided for the seven electroacoustic transducers 40A-40G. The cavities 42A-42G are in fluid communication via interconnecting passageways (not shown) and in fluid communication with the transmission medium, in use, via one or more passageways (not shown).

In more detail, the electroacoustic transducer array comprises an array housing 44 arranged to house the first electroacoustic transducer 40A and the second electroacoustic transducer 40B. Similarly, the array housing 44 is arranged to house the other electroacoustic transducers 40C-40G. The array housing 44 is provided as a plate, having perforations therein and/or therethrough to receive the first electroacoustic transducer 40A and the second electroacoustic transducer 40B therein, and the other electroacoustic transducers 40C-40G. Sound emitting surfaces, 401A and 401B respectively, of the first electroacoustic transducer 40A and/or the second electroacoustic transducer 40B are recessed relative to a surface 441, for example a front surface 441, of the array housing 44. Generally, the electroacoustic transducers 40C-40G have sound emitting surfaces 401C-401G, similarly arranged. By recessing the first electroacoustic transducer 40A and/or the second electroacoustic transducer 40B in this way, the first cavity 42A and the second cavity 42B respectively are provided by the recesses thus defined. The array housing comprises passageways, as described above.

The acoustic coupling layer 43 is arranged to extend across the whole surface of the electroacoustic transducer array 120. Particularly, the acoustic coupling layer 43 comprises a continuous acoustic coupling layer 43 arranged to extend across the whole surface of the electroacoustic transducer array 120. The acoustic coupling layer 43 is arranged to contact at least the part of the surface of the array housing 44. The acoustic coupling layer 43 is releasably coupled to the array housing 120.

The advantages of the electroacoustic array 120 are as described above with respect to the fourth aspect.

In summary, the invention provides an electroacoustic transducer comprising: an active element; and an acoustic coupling layer arranged to acoustically couple, in use, the active element to a transmission medium; wherein the electroacoustic transducer further comprises a cavity arranged between the active element and the acoustic coupling layer to receive a fluid; whereby acoustic coupling of the electroacoustic transducer and the transmission medium is improved. Also provided is a Tonpilz transducer comprising: an active element; and an acoustic coupling layer arranged to acoustically couple, in use, the active element to a transmission medium; wherein the acoustic coupling layer comprises an acoustic meta-material. Also provided is an array comprising a plurality of such transducers. Also provided is an electroacoustic transducer array.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An electroacoustic transducer array configured for use in a liquid transmission medium, the electroacoustic transducer array comprising:

a first electroacoustic transducer comprising a first active element;

a second electroacoustic transducer comprising a second active element;

an acoustic coupling layer arranged to acoustically couple, in use, the first active element and the second active element to a liquid transmission medium, the acoustic coupling layer having a porous structure; and the first active element spaced from the acoustic coupling layer by a first cavity arranged between the first active element and the acoustic coupling layer, wherein the first cavity is in fluid communication with the liquid transmission medium via the porous structure, in use; and the second active element spaced from the acoustic coupling layer by a second cavity arranged between the second active element and the acoustic coupling layer, wherein the second cavity is distinct from the first cavity and the second cavity is in fluid communication with the liquid transmission medium via the porous structure, in use;

wherein, during use, the first cavity and the second cavity contains part of the liquid transmission medium, and wherein the liquid transmission medium provides a fluid reservoir to the first cavity and the second cavity.

2. The transducer array according to claim 1, wherein the acoustic coupling layer comprises an acoustic meta-material.

3. The transducer array according to claim 1, wherein an acoustic impedance of the acoustic coupling layer changes in a longitudinal direction away from the first cavity and/or the second cavity.

4. The transducer array according to claim 1, wherein a thickness of the acoustic coupling layer corresponds to $(2n+1)\Lambda/4$ where $\Lambda$ is the acoustic wavelength within the acoustic coupling layer, and n is either 0 or a positive integer.

5. The transducer array according to claim 1, wherein a thickness of the acoustic coupling layer corresponds to $(n+1)\Lambda/2$ where $\Lambda$ is the acoustic wavelength within the acoustic coupling layer, and n is either 0 or a positive integer.

6. The transducer array according to claim 1, wherein a thickness of the acoustic coupling layer corresponds to $m\Lambda$ where $\Lambda$ is the acoustic wavelength within the transmission medium and/or within the acoustic coupling layer and m is a positive real number greater than 0.9.

7. The transducer array according to claim 1, wherein a porosity of the porous structure is in a range from about 5% to about 90% by volume of the porous structure.

8. The transducer array according to claim 7, wherein the porosity increases in a direction moving away from the first cavity and/or the second cavity.

9. The transducer array according to claim 1, wherein the acoustic coupling layer comprises a plurality of acoustic coupling members.

10. The transducer array according to claim 9, wherein the acoustic coupling members taper in the longitudinal direction.

11. The transducer array according to claim 1, wherein the acoustic coupling layer comprises an encapsulant.

12. The transducer array according to claim 1, comprising an array housing arranged to house the first electroacoustic transducer and the second electroacoustic transducer and wherein the acoustic coupling layer is arranged to extend across at least a part of a surface of the array housing.

13. The transducer array according to claim 12, wherein the acoustic coupling layer is arranged to contact at least the part of the surface of the housing.

14. The transducer array according to claim 1, wherein the first transducer and/or the second transducer is a Tonpilz transducer.

15. The transducer array according to claim 11, wherein the encapsulant is an elastomeric material.

16. An electroacoustic transducer array comprising:

one or more active elements;

an acoustic coupling layer arranged to acoustically couple, in use, at least some of the one or more active elements to a liquid transmission medium, wherein the acoustic coupling layer comprises an acoustic meta-material having pores, voids and/or spacings;

at least one of the one or more active elements is spaced from the acoustic coupling layer by a cavity arranged between the at least some of the one or more active elements and the acoustic coupling layer, wherein the cavity is in fluid communication with the liquid transmission medium via the pores, voids, and/or spacings, and wherein the cavity contains part of the liquid transmission medium, in use; and an array housing arranged to house the one or more active elements and wherein the acoustic coupling layer is arranged to extend across at least a part of a surface of the array housing.

17. The transducer array according to claim 16, wherein a porosity of the acoustic meta-material increases in a direction moving away from the cavity.

18. The transducer array according to claim 16, wherein the acoustic meta-material comprises open pores.

19. The transducer array according to claim 16, wherein the electroacoustic transducer has a centre frequency from 1 kHz to 80 kHz in water.

20. An electroacoustic transducer array for use in a liquid transmission medium, comprising:

one or more active elements;

an acoustic coupling layer arranged to acoustically couple, in use, the one or more active elements to a liquid transmission medium, wherein the acoustic coupling layer comprises an acoustic meta-material having pores, voids, and/or spacings;

the one or more active elements spaced from the acoustic coupling layer by a cavity arranged between at least one of the one or more active elements and the acoustic coupling layer, wherein the cavity is in fluid communication with the liquid transmission medium via the pores, voids, and/or spacings, and wherein the cavity contains part of the liquid transmission medium, in use; and wherein the transmission medium provides a fluid reservoir to the cavity.

* * * * *